(12) United States Patent
Yamada

(10) Patent No.: US 6,929,549 B1
(45) Date of Patent: Aug. 16, 2005

(54) GAME MACHINE SYSTEM WITH SERVER DEVICE, DISPLAY DEVICE, AND GAME EXECUTING DEVICE CONNECTED BY EXTERNAL COMMUNICATION LINE AND METHOD OF USING THE SYSTEM

(75) Inventor: Akihiro Yamada, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/697,554

(22) Filed: Oct. 26, 2000

(30) Foreign Application Priority Data

Nov. 2, 1999 (JP) ................................ P11-312073

(51) Int. Cl.$^7$ ............................................. A63F 9/22
(52) U.S. Cl. ....................................................... 463/42
(58) Field of Search .............................. 463/40, 42, 41

(56) References Cited

U.S. PATENT DOCUMENTS

| | | | | |
|---|---|---|---|---|
| 4,897,874 A | * | 1/1990 | Lidinsky et al. | 713/201 |
| 5,404,527 A | * | 4/1995 | Irwin et al. | 709/222 |
| 5,577,735 A | * | 11/1996 | Reed et al. | 463/40 |
| 5,634,848 A | * | 6/1997 | Tsuda et al. | 379/111 |
| 5,664,778 A | * | 9/1997 | Kikuchi et al. | 273/148 B |
| 5,675,390 A | * | 10/1997 | Schindler et al. | 345/717 |
| 5,771,354 A | * | 6/1998 | Crawford | 707/204 |
| 6,273,821 B1 | * | 8/2001 | Moriguchi | 463/40 |
| 6,386,980 B1 | * | 5/2002 | Nishino et al. | 463/40 |
| 6,594,677 B2 | * | 7/2003 | Davis et al. | 707/204 |
| 2004/0097288 A1 | * | 5/2004 | Sloate et al. | 463/42 |
| 2004/0168202 A1 | * | 8/2004 | Ebihara | 725/133 |

OTHER PUBLICATIONS

Definition of JPEG, http://www.ptpm.usm.my/ppg_201/JPEG.html.*
Examiner's Affidavit.*
Examiner's Affidavit, Jun. 27, 2002.*
Computer Hardware, Information About the Computer Bus (http://computerhope.com/help/bus.htm).*

* cited by examiner

Primary Examiner—Jessica Harrison
Assistant Examiner—Corbett Coburn
(74) Attorney, Agent, or Firm—Oblon, Spivak, McClelland, Maier & Neustadt, P.C.

(57) ABSTRACT

The present game machine system allows a user to enjoy, at home, games according to supplied game software at low cost. The game machine system includes a game machine, an STB, and a television receiver, which are connected to each other via a digital bus that is external to them all. The STB receives game software transmitted via digital broadcasting and stores the received game software on a hard disk in the STB. The game machine executes a game while accessing the hard disk to read the game software as required. An image generated by the game machine and image data such as a background image output from the STB are supplied to the television receiver via the digital bus and a game image is displayed on the screen of the television receiver.

32 Claims, 11 Drawing Sheets

GAME MACHINE SYSTEM WITH SERVER DEVICE, DISPLAY DEVICE, AND GAME EXECUTING DEVICE CONNECTED BY EXTERNAL COMMUNICATION LINE AND METHOD OF USING THE SYSTEM

BACKGROUND OF THE INVENTION

1. Field of the Invention

The present invention relates to a game machine system for use at home to enjoy various games presented by game software information generally called television games or computer games, and to a server device, a game executing device, and a display device used in the game machine system, and also to a game usage method which allows a wide variety of games using the game machine system.

2. Description of the Related Art

Among various home-use electronic devices, game machines are becoming increasingly popular. A typical game machine executes a game in accordance with game software information stored on a storage medium such as a CD-ROM (compact disk ROM) or a DVD (digital video disk) wherein a game image is displayed on a television receiver connected to the game machine in accordance with a control command issued by a user thereby allowing the user to enjoy the game.

The various kinds of game software information provided via a storage medium such as a CD-ROM or a DVD includes a game control program and display data used to form a game screen in accordance with the game control program. Typically, the game machine is made up of a main part and a control unit. The main unit includes a drive of a storage medium such as a CD-ROM or a DVD, a CPU, a ROM, and a RAM and serves to execute a game in accordance with game software information stored on a storage medium. The control unit is usually called a game controller and servers to input a command given by a user.

In accordance with a game control program which is read from the storage medium and executed, and in response to a command given by the user via the control unit, the main unit of the game machine generates a game image using image data included in the game software information. The game image is supplied to a monitor device such as a television receiver connected to the main unit of the game machine and is displayed thereon. Thus, the user can enjoy the game.

By replacing the storage medium such as a CD-ROM on which game software information is stored with another storage medium, it is possible to enjoy various games such as role-playing games, action games, and simulation games. Thus, game machines are now widely used at home by a large number of users.

Game software information is generally supplied in the form of a software package in which game software is stored on a storage medium such as a CD-ROM or a DVD. Therefore, game machines are necessary to have a drive for reading game software information stored on a storage medium. This results in an increase in the cost of the game machines.

Therefore, to enjoy a game supplied in the form of game software information at home, a user has to buy an expensive game machine and a storage medium on which desired game software information is stored. Furthermore, to enjoy various different games, it is necessary to buy a large number of storage media on which game software information is stored.

As described above, the problem for users who want to enjoy games at home is that it is necessary to buy an expensive game machine and storage media including game software information stored thereon. Thus there is an increasing need for a game machine system which allows users to easily enjoy games at lower cost.

One possible technique to meet the above requirement is to connect a game machine to an external server via a communication network such as the Internet so as to obtain game software information stored in the server by getting access thereto. This makes it unnecessary for home-use game machines to have a drive of storage medium such as a CD-ROM or a DVD, and thus a reduction in the cost of game machines can be achieved.

However, the transmission capacity of communication networks is generally low. This makes impossible to display game images including quick motions at a desirable high speed, and thus users cannot sufficiently enjoy games. Another problem is that it is necessary to maintain the connection of the communication line between the game machine at home and the external server device, and thus an expensive communication cost is required.

SUMMARY OF THE INVENTION

In view of the above, it is an object of the present invention to provide a game machine system which allows a user to easily use a game presented by game software information at low cost. It is another object of the present invention to provide a server device, a game executing device, and a display device used in the game machine system. It is still another object of the present invention to provide a game usage method using the game machine system.

According to an aspect of the present invention, there is provided a game machine system comprising a server device, a display device, and a game executing device, which are connected to each other via a digital communication line, the server device comprising: information storage unit for storing game software information including a game control program and display data used to form a game screen in accordance with the game control program; game software information acquisition means for acquiring the game software information which is provided by means of broadcasting or via a dedicated communication line and storing the acquired game software information in the information storage unit; and information transmitting means for reading necessary information from the information storage unit in response to a request received via the digital communication line and transmitting the information over the digital communication line, the game executing device comprising: game selection command input means for inputting a game selection command to select a specified game; a game selection request transmission means for transmitting, over said digital communication line, a game selection request for selection of the game specified by said game selection command input via said game selection command input means; game control command input means for inputting a game control command; information request transmission means for transmitting, over said digital communication line, an information request for providing necessary information in accordance with the game control program specified by said game selection command and in accordance with the game control command input via said game control command input means; information acquisition means for acquiring necessary information from the information received via the digital communication line; and image generation means for generating an image in accordance with game display data included in the information acquired via the information acquisition means and transmitting the image information representing the generated image over the digital communication line, the display device comprising: image information acquisition means for acquiring image information transmitted via the digital communication line; and image displaying means for displaying an image in according with the image information acquired the said image information acquisition means.

In this game machine system, the server device, the display device, and the game executing device are connected to each other via the digital communication line so as to form the game machine system. Game software information is supplied via a communication medium having a high transmission capacity such as digital satellite broadcasting, digital ground-wave broadcasting, or a dedicated communication line. The game software information is acquired by the game software information acquisition means of the server device and stored in the information storage unit of the server device.

The game software information stored in the information storage unit of the server device is supplied to the game executing device via the digital communication line in response to a request issued by the game executing device. In the game executing device, a game image is generated in accordance with the supplied information and the resultant image is output over the digital communication line to supply it to the display device. Thus, the game image is displayed on the display device, thereby making it possible for the user to enjoy the game.

As described above, the game executing device executes a game using the game software information stored in the information storage unit of the server device, and thus it is not necessary for the game executing device to include a drive for driving a storage medium on which game software information is stored. Therefore, the cost of the game executing device becomes low.

Because the server device can acquire game software information via the broadcasting or the dedicated communication line, it not necessary to purchase a so-called packaged medium on which game software information is stored. This makes is possible to easily obtain game software information and enjoy it. That is, it is possible to obtain game software information at low cost without having to go out to visit a shop, and enjoy the game in accordance with the game software information obtained.

In this game machine system according to the present invention, the image information acquisition means of the display device is capable of acquiring data-compressed image information transmitted from the server device over the digital communication line and also image information generated, data-compressed, and transmitted over the digital communication line by the game executing device, and the display device may further comprise: decompression means for decompressing the data-compressed image information acquired by the image information acquisition means; and image synthesizing means for synthesizing an image from the image represented by the image information which has been received from the server device and then decompressed by the decompression means and the image represented by the image information which has been generated by the game executing device and then decompressed by the decompression means.

In this game machine system, the display device includes the decompressing means and the image synthesizing means whereby image data such as a background image is acquired directly from the server device and decompressed, and the resultant decompressed image data is combined, by the image synthesizing means, with the image such as a character image generated by the game executing device. The synthesized image is displayed on the display device.

This allows the game image to be displayed at a high speed, and thus it becomes possible to present a high-quality game image including quick motions at low cost.

In this game machine system according to the present invention, the server device may further include: additional information acquisition means for acquiring additional information associated with selectable information used in a game and storing the additional information in the information storage unit, the additional information being supplied by means of broadcasting or via a dedicated communication line; and additional information transmission means for reading the information acquired as the additional information in response to an additional information providing request received via the digital communication line and then transmitting the information over the digital communication line instead of the original information used in the game, and the game executing device may further include: additional information selection command input means for inputting an additional information selection command specifying additional information to be used instead of selectable information used in the game; and additional information request transmission means for transmitting a request for additional information specified by the additional information selection command input via the additional information selection command input means, over the digital communication line.

Thus, in this game machine system, the additional information acquisition means of the server device acquires additional information supplied by means of broadcasting or via the dedicated communication line, and the acquired additional information is stored in the information storage unit. Herein, the additional information is selectable information such as data representing characters, data representing background images, information representing the colors of characters, information representing the colors of background images, and voice data, which can be selected and used in games.

The additional information request transmission means of the server device transmits, via the digital communication line, additional information specified by the additional information request transmitted by the additional information request transmission means of the game executing device via the digital communication line, so as to use the additional information instead of the current selectable information.

That is, by employing additional information associated with selectable information such as character data used in the game instead of the current data, it is possible to modify the characters, the background image, and the voices into forms desired by the user. Because the additional information is supplied by the game software information provider, it is possible to obtain and use a wide variety of additional information.

Furthermore, in the game machine system according to the present invention, one of devices connected to said digital communication line preferably includes: communication line connecting means for connecting a communication line with the game software information provider in response to a command issued by the user; and information request transmission means for transmitting, in response to a command issued by the user, a request for desired information to the game software information provider via the communication line connected by the communication line connecting means.

In this game machine system, the communication line connecting means makes a connection between the game software information provider and the game machine system via a communication line. After establishing the connection via the communication line, an information providing request for providing game software information or additional information desired by the user is transmitted in response to a command issued by the user to the game software information provider via the communication line.

Upon reception of the information providing request transmitted via the communication line, the game software information provider transmits the requested game software information or additional information by means of broadcasting or via the dedicated communication line. This allows the user to easily acquire desired game software information or additional information at low cost, when the user needs it.

Furthermore, in the game machine system according to the present invention, one of devices connected to the digital communication line preferably includes: a usage history information storage unit for storing information about the history of usage of games; usage history information updating means for updating the information about the history of usage of games stored in the usage history information storage unit, when the game selection command transmission means of the game executing device has transmitted a game selection command, thereby making it possible to perform accounting in accordance with the usage history information stored in the usage history information storage unit.

Thus, in this game machine system, when the game selection command transmission means transmits a game selection command, the information about the history of usage of games stored in the usage history information storage unit is updated, so that accounting can be performed in accordance with the usage history information stored in the usage history information storage unit.

The information identifying games and the information representing the number of times the games have been used may be employed as the usage history information. This makes it possible to perform accounting in accordance with the number of times the games have been used. That is, it becomes possible to charge the fee even for one-time use of a game, thereby allowing the user to enjoy games on a pay-per-play basis in a similar manner as if the user were enjoying games in an amusement arcade.

In the game machine system according to the present invention, one of devices connected to the digital communication line preferably includes: communication line connecting means for connecting a communication line with the game software information provider; usage history information transmission means for transmitting the usage history information stored in the usage history information storage unit via the communication line, at a scheduled time or in response to a usage history information transmission request transmitted from the game software information provider via the communication line.

In this game machine system, the usage history information stored in the usage history information storage unit is transmitted from the game machine system to the game software information provider via the communication line, at the scheduled time or in response to a usage history information transmission request transmitted from the game software information provider via the communication line.

This makes it possible for the game software information provider to correctly and reasonably perform the accounting process in accordance with the usage history information transmitted from the game machine system.

Furthermore, in the game machine system according to the present invention, the digital communication line may include a digital serial bus.

In this case, all devices or some particular devices in the game machine system may be connected via a digital serial bus according to, for example, the IEEE-1394 standard or the USB-2.0 standard.

This allows various kinds of data such as image data to be transmitted at a high speed between the devices connected via the digital serial bus.

Furthermore, in the game machine system according to the present invention, the digital communication line may include a wireless communication channel.

In this game machine system, all devices or some particular devices in the game machine system are connected via the wireless communication channel. This allows devices to be connected without having to use complicated cables which would be obstructive and which would limit the locations of the devices connected to the digital communication line.

DESCRIPTION OF THE PREFERRED EMBODIMENTS

The game machine system, the server device the game executing device, the display device, and the method of using a game according to the present invention are described in further detail below with reference to preferred embodiments in conjunction with the accompanying drawings.

First Embodiment

Figure 1:
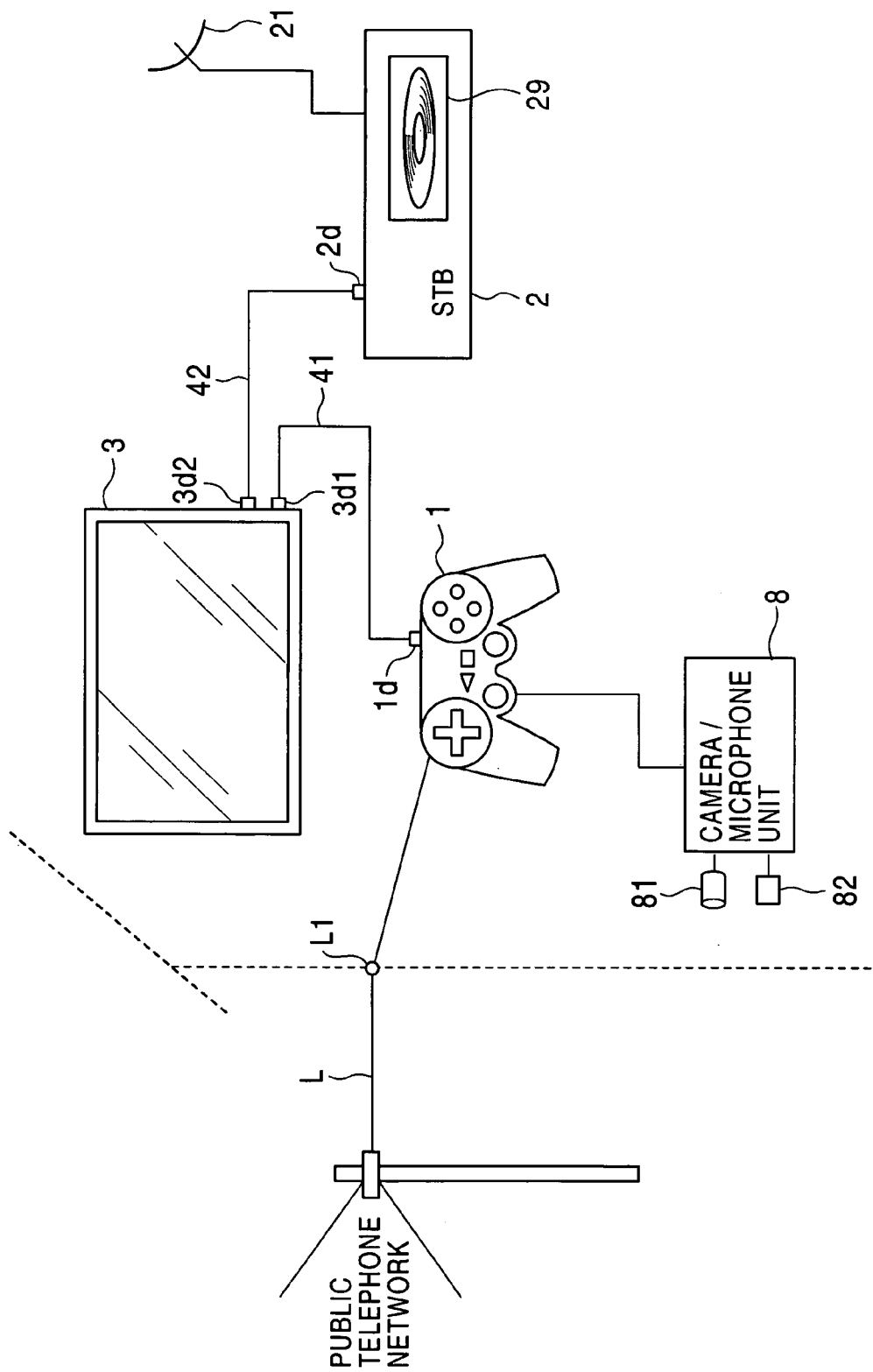
FIG. 1 is a schematic diagram illustrating an embodiment of a game machine system according to the present invention.
Figure 2A:
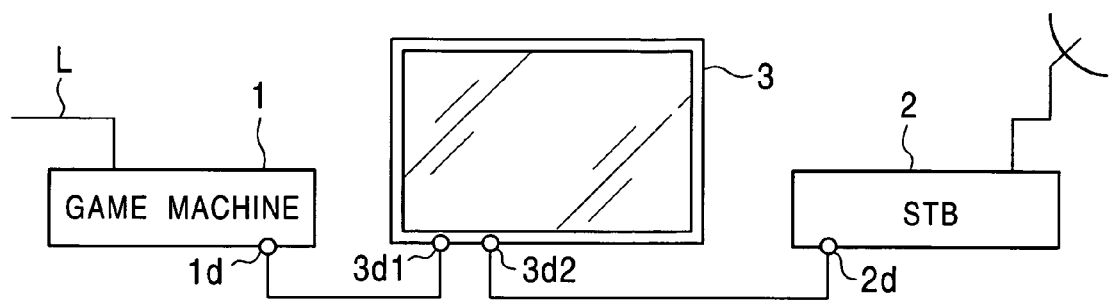
FIGS. 2A and 2B are schematic diagrams illustrating connections among various devices in the game machine system according to the embodiment of the present invention.
Figure 2B:
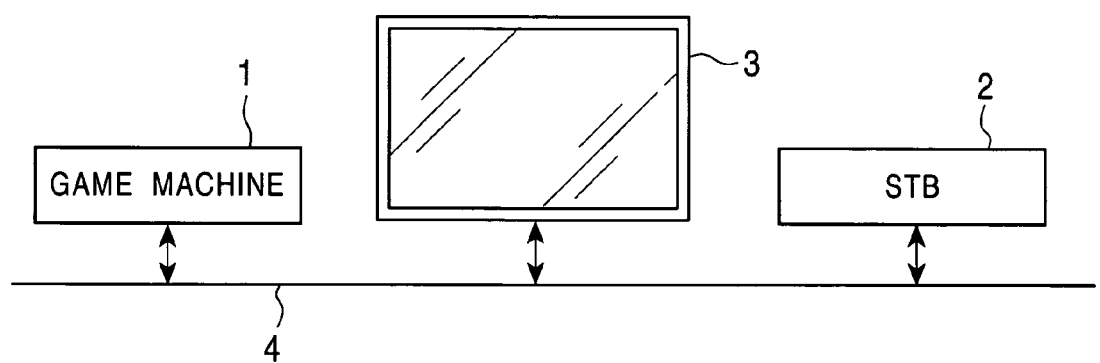

FIG. 1 is a schematic diagram illustrating a first embodiment of a game machine system using a game usage method according to the present invention. FIGS. 2A and 2B are schematic diagrams illustrating connections among various devices in the game machine system of the first embodiment.

In this first embodiment, as shown in FIG. 1, the game machine system (home network system) includes a game machine 1 serving as the game executing device according to the present invention, a set top box (hereinafter referred to as an STB) 2 which is a digital satellite broadcasting receiver and which serves as the server device according to the present invention, a television receiver 3 serving as the display device according to the present invention, wherein these devices are connected to each other via a digital serial bus according to the IEEE-1394 standard (hereinafter referred to simply as a digital bus) serving as the digital communication line.

That is, in this first embodiment, the game machine 1, the STB 2, and the television receiver 3 each include a digital input/output terminal and a digital interface circuit according to the IEEE-1394 standard. Furthermore, in this first embodiment, as shown in FIG. 1, the digital input/output terminal 1d of the game machine 1 and the digital input/output terminal 3d1 of the television receiver are connected to each other via a digital bus 41, and the digital input/output terminal 2d of the STB 2 and the digital input/output terminal 3d2 of the television receiver 3 are connected to each other via a digital bus 42 thereby forming a home network system.

The connections among the respective parts of the game machine system according to this first embodiment are illustrated in a simpler fashion in FIG. 2A to provide an easier understanding. That is, as shown in FIG. 2A, the game machine 1 and the STB 2 are connected to the television receiver 3. The connections, illustrated in FIG. 2A, among the respective parts via the digital bus are equivalent to the connections among them via a single digital bus 4 shown in FIG. 2B.

Thus, in this game machine system according to the first embodiment, information can be transmitted/received not only between the game machine 1 and the television receiver 3 and between the STB 2 and the television receiver 3 but also between the game machine 1 and the STB 2 via the digital bus 4.

In this first embodiment, game control programs and game software information including image information representing game images or moving image information are not supplied via packaged media such as a CD-ROM or a DVD. Instead, in this first embodiment, game software information is received using the STB 2 via digital satellite broadcasting, as will be described later. The received game software information is stored on a hard disk included in the STB 2.

The game software information stored on the hard disk of the STB 2 is used by the game machine 1 to execute a game. The game machine 1 also includes a modem and is connected, via a communication line, to a game provider which provides game software. If the game provider receives a request for particular game software information, from the game machine 1 via the communication line, the game provider 1 supplies the requested game software information via the broadcasting media.

This makes it unnecessary for the game machine to have a drive of a storage medium such as a CD-ROM or a DVD. Thus, it becomes possible to realize a game machine in a simpler fashion, which results in a reduction in cost. Conventionally, a game machine is made up of a main part including a CD-ROM drive or a DVD drive and a control unit called a game controller. In contrast, in the present embodiment, as shown in FIG. 1, all functions needed for games are implemented on the control unit similar to the conventional game controller.

The game provider accepts a request for particular game software information, and supplies the requested game software information via the broadcasting medium. This allows a wide variety of game software information to be supplied to a large number of users at low cost.

In the game machine system according to the first embodiment, as shown in FIG. 1, the game machine 1 is also connected to a camera/microphone unit 8 including a CCD camera 81 and a microphone 82. The camera/microphone unit 8 is used to input information which is needed to change characters or voices used in games into desired ones. The modification of characters or voices can makes games more enjoyable.

Devices Making Up the Game Machine System

Various devices making up the game machine system according to the first embodiment are described below.

Game Machine

Figure 3:
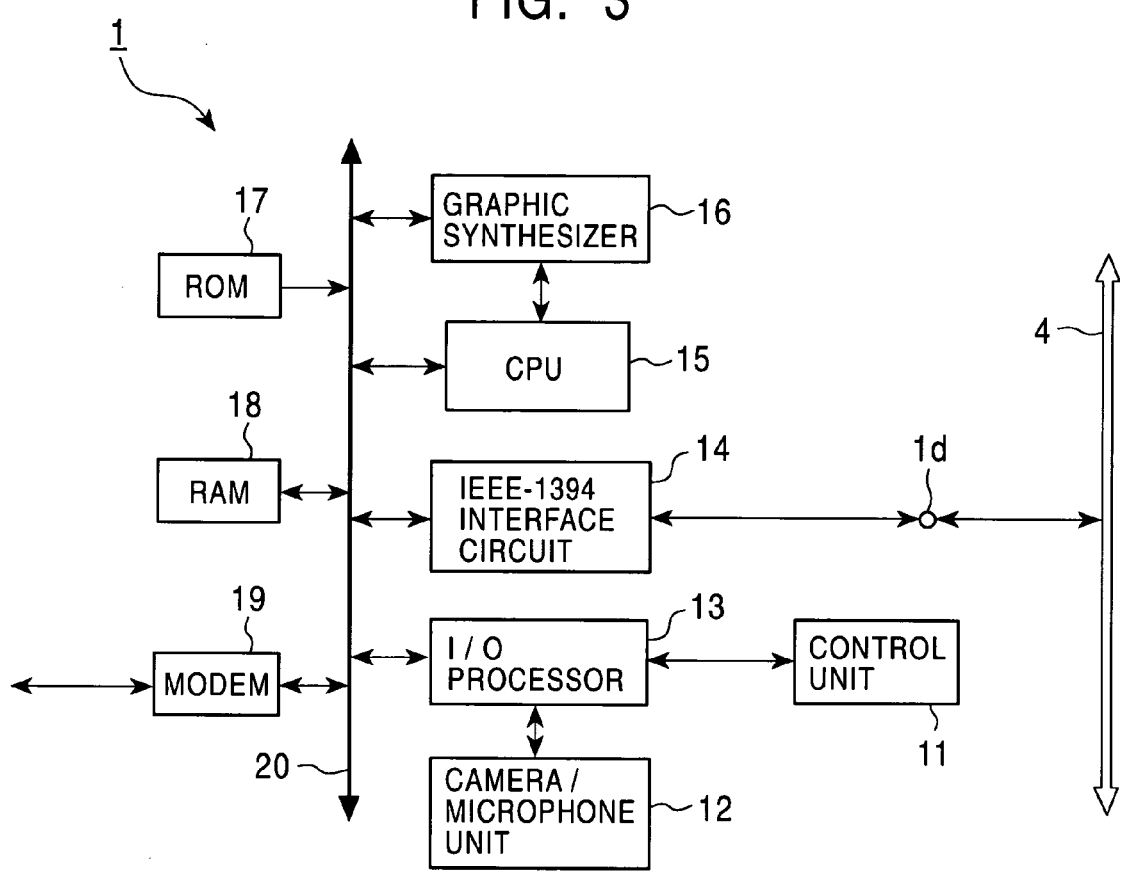
FIG. 3 is a block diagram illustrating a game machine in the game machine system shown in FIG. 1, according to the embodiment of the present invention.

FIG. 3 is a block diagram illustrating the game machine according to the first embodiment. In this first embodiment, as shown in FIG. 3, the game machine includes an I/O processor 13, an IEEE-1394 interface circuit 14, a CPU 15, a graphic synthesizer 16, a ROM 17, a RAM 18, and a modem 19, wherein these parts are connected to each other via a CPU bus 20.

The CPU 15 and the graphic synthesizer 16 also have a direct connection with each other so that the CPU 15 can directly control the graphic synthesizer 16. The I/O processor 13 is connected to a control unit 11 and a camera/microphone unit 12.

The control unit 11 is used by a user to input various commands during games. The camera/microphone unit 12 is used to input an image or a voice to be used in a game instead of a current character or voice.

The I/O processor 13 serves as an interface between the game machine 1 and the control unit 1 and the camera/microphone unit 12 so that data output from the control unit 11 or the camera/microphone unit 12 can be input to the game machine 1 via the I/O processor 13.

As described above, the game machine 1 includes the IEEE-1394 interface circuit 14 to transmit/receive various kinds of information to/from the STB 2 or the television receiver 3 connected via the digital bus 4. The use of the digital interface according to the IEEE-1394 standard allows information including a large amount of data, such as image or voice information, to be transmitted between devices connected to the digital bus at a high speed.

In the game machine 1 according to the first embodiment, a processing program and various data required to realize the basis functions of the game machine 1 are stored in the ROM 17. The RAM 18 is used to store a game control program and image data representing a game image supplied from the STB 2 via the digital bus 4 as will be described later. The RAM 18 is also used as a work area for various kinds of processing.

The graphic synthesizer 16 performs graphic processing such as character rendering to generate a game image. The CPU 15 controls the various parts of the game machine 1. For example, during a game, the CPU 15 generates a game image using the graphic synthesizer 17 and other parts in accordance with the game control program supplied from the STB 2 and also in accordance with commands input by the user via the control unit 11.

The CPU 15 also controls the graphic synthesizer 16 and the IEEE-1394 interface circuit 14 such that the data of the image generated using the graphic synthesizer 16 is compressed according to the MPEG standard and transmitted via the IEEE-1394 interface circuit 14 over the digital but 4 according to the AV protocol. In the present embodiment, the compression of the data of the generated image is performed by the graphic synthesizer 16.

The game machine 1 can control the STB 2 and the television receiver 3 connected to the digital bus 4, using AV/C commands defined in the IEEE-1394 standard regarding the digital interface.

The game machine 1 of this first embodiment also includes the modem 19 for making a connection with the game provider via a communication line thereby making it possible to communicate with the game software information provide. More specifically, via the communication line connected by the modem 19, the game machine 1 can transmit a game selection menu transmission request to the game provider and can receive a game selection menu returned from the game provider.

That is, the game machine 1 of this first embodiment connects the communication line to the server in the game provider in accordance with the basis program stored in the ROM 17 and in response to a command given by the user and transmits a game selection menu transmission request together with a password and/or user identification information to the server of the game provider via the communication line.

If the server in the game provider receives the game selection menu transmission request via the communication line, the server performs authentication. If the password and the user identification information pass the authentication, a game selection menu representing available games (in the form of a list) is transmitted from the server of the game provider to the game machine 1 via the communication line connected between the game machine 1 and the server of the game provider.

If the game machine 1 receives the game selection menu from the game provider, the game machine 1 supplies the received game selection menu to the television receiver 3 via the digital bus 4. The television receiver 3 displays the received game selection menu on the display device thereof.

If the user of the game machine 1 selects a desired game from the game selection menu displayed on the display device of the television receiver 3, by operating the control unit 11 of the game machine 1, a request for transmission of the selected game is transmitted to the game provider via the communication line connected between the server of the game provider and the game machine 1.

In the above game selection process, the game selection menu displayed on the television receiver 3 may be scrolled in response to an operation of the control unit 11 thereby allowing the user to select a desired game.

Upon reception of the game transmission request, the game provider transmits the game software information of the requested game to the game machine 1 via a broadcasting medium such as digital satellite broadcasting or groundwave broadcasting. The game software information transmitted from the game provider is received by the STB 2 in the game machine system according to the present embodiment, and stored on the hard disk (information storage unit) of the STB 2 so that the game machine 1 can use the game software information.

When the game software information of the game selected by the user of the game machine 1 has been completely stored on the hard disk of the of the STB 2, a message is transmitted to the server of the game provider via the communication line connected between the game machine 1 and the server of the game provider to notify the server of the game provider that the storage of the game soft information has been completed. In response, the server of the game provider performs an accounting process.

In this first embodiment, as described above, a request for game software information is transmitted to the game provider, and the game provider transmits the requested game software information via digital satellite broadcasting. The game software information transmitted via the digital satellite broadcasting is received and stored by the STB 2 connected to the game machine 1 via the digital bus 4. Thus, it becomes possible for the game machine 1 to use the game software information stored in the STB 2.

STB (Set Top Box)

Figure 4:
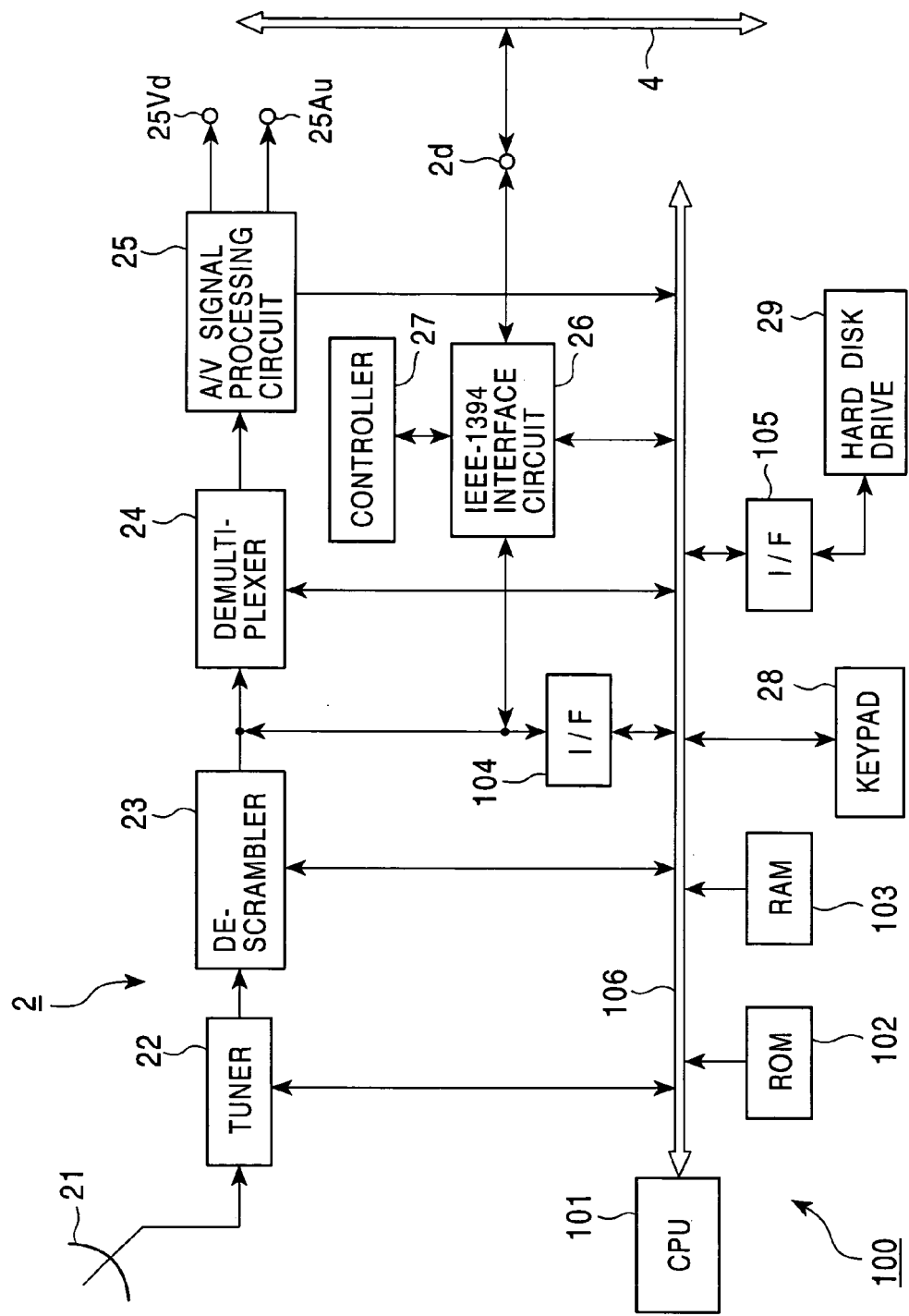
FIG. 4 is a block diagram illustrating an STB (set top box) in the game machine system shown in FIG. 1, according to the embodiment of the present invention.

FIG. 4 is a block diagram illustrating the STB 2 of the game machine system according to the first embodiment. Digital satellite broadcasting signals are received via an antenna 21 and transferred to a tuner 22. The tuner 22 selects a particular digital satellite broadcasting signal in accordance with a selection control signal supplied from a controller 100. The selected digital satellite broadcasting signal is demodulated and supplied to the descrambler 23. In the above operation, the selection control signal is generated by the controller 100 in accordance with a selection command issued by a user via a keypad 28 of the STB 2.

The descrambler 23 descrambles the scrambled (encrypted) digital satellite broadcasting signal, using encryption key information. The encryption key information used in this descrambling process may be stored in advance, for example, in the ROM 102 of the STB 2.

After being descrambled by the descrambler 23, the digital satellite broadcasting signal is supplied to a demultiplexer 24, which in turn extracts a video signal and an audio signal of a broadcasting program according to the selection control signal supplied from the controller 100. The extracted signal is supplied to an A/V signal processing circuit 25.

In the digital satellite broadcasting, MPEG-compressed signals of a plurality of broadcasting programs are muliplexed into a digital satellite broadcasting signal and broadcasted via a single channel. From the multiplexed signal, the demultiplexer 24 extracts the video signal and the audio signal of the broadcasting program specified by the selection control signal generated in accordance with the selection command issued by the user via the keypad 28 of the control unit 10.

In order for the user to easily and quickly select a desired broadcasting program, an electronic program table of digital satellite broadcasting programs is displayed on the screen of the television receiver so as to present to the user a list of broadcasting programs muliplexed on the selected digital satellite broadcasting signal.

The A/V signal processing circuit 25 decompresses the compressed video signal and audio signal and thereby reproducing the original video signal and audio signal. Furthermore, an analog video signal to be supplied to an analog monitor device is generated from the decompressed digital video signal, and an analog audio signal to be supplied to a loudspeaker is generated from the decompressed audio signal.

The analog video signal generated by the A/V signal processing circuit 25 is output via an video signal output terminal 25Vd and supplied to the analog monitor device which in turn displays the image of the digital satellite broadcasting program on the display device of the analog monitor device. On the other hand, the analog audio signal generated by the A/V signal processing circuit 25 is output via an audio signal output terminal 25Au and supplied to the loudspeaker which in turn generates a voice/sound of the digital satellite broadcasting program.

In this first embodiment, the STB 2 has the capability of outputting the selected and descrambled digital satellite broadcasting signal over the digital bus via the IEEE-1394 interface circuit and/or storing it on a hard disk driven by the hard disk drive disposed in the STB 2.

That is, the descrambled digital satellite broadcasting signal output from the descrambler 23 is output via the IEEE-1394 interface circuit 26 and further via the digital output terminal 2d and supplied to an electronic device connected to the digital bus.

If the user sets the STB 2 into a record mode by operating the keypad 28 of the STB 2, the scrambled digital satellite broadcasting signal output from the descrambler 23 is supplied to the hard disk drive 29 via the interface circuit 104, the CPU bus 106, and the interface circuit 105.

The hard disk drive 29 has the capability of writing/reading data to/from the hard disk. In the record mode, the data supplied via the interface circuit 105 is stored on the hard disk in accordance with a control signal supplied from the controller 100.

That is, when a digital satellite broadcasting signal carrying game software information transmitted from the game provider is selected by the STB 2, and if the STB 2 is set in the record mode, the game software information, transmitted by means of the digital satellite broadcasting from the game provider in response to the game software information providing request transmitted from the user via the telephone line, is received and stored on the hard disk of the hard disk drive 29.

In this first embodiment, if the game software information received via the digital satellite broadcasting is scrambled, it is descrambled using encryption key information (authorization information) which is provided from the game provider via the communication line and via the modem 19 of the game machine 1.

If a request transmitted by the game machine 1 via the digital bus 4 is received via the digital input/output terminal 2d and further via the IEEE-1394 interface circuit 26, the controller 100 controls the hard disk drive 29 and reads a game control program or image data for generating a game image from the hard disk of the hard disk drive 29 and supplies the game control program or the image data to the game machine 1 or the television receiver 3 via the digital bus 4.

In this case, the data of interest read from the hard disk of the hard disk drive 29 is transmitted over the digital bus 4 via the interface circuit 105, the controller 100, the interface circuit 104, the IEEE-1394 interface circuit 26, and the digital input/output terminal 2d.

As described above, game software information supplied by means of digital satellite broadcasting is received and stored by the STB 2, and the game machine 1 uses the game software information stored in the STB 2 thereby allowing the user to enjoy the game.

In the present embodiment, when the STB 2 receives digital data such as a digital satellite broadcasting signal via the digital bus 4 and further via the IEEE-1394 interface circuit 26, the STB 2 can reproduce it. Furthermore, the STB 2 can also reproduce digital satellite broadcasting programs stored on the hard disk of the hard disk drive 29 of the STB 2.

Television Receiver (Display Device)

Figure 5:
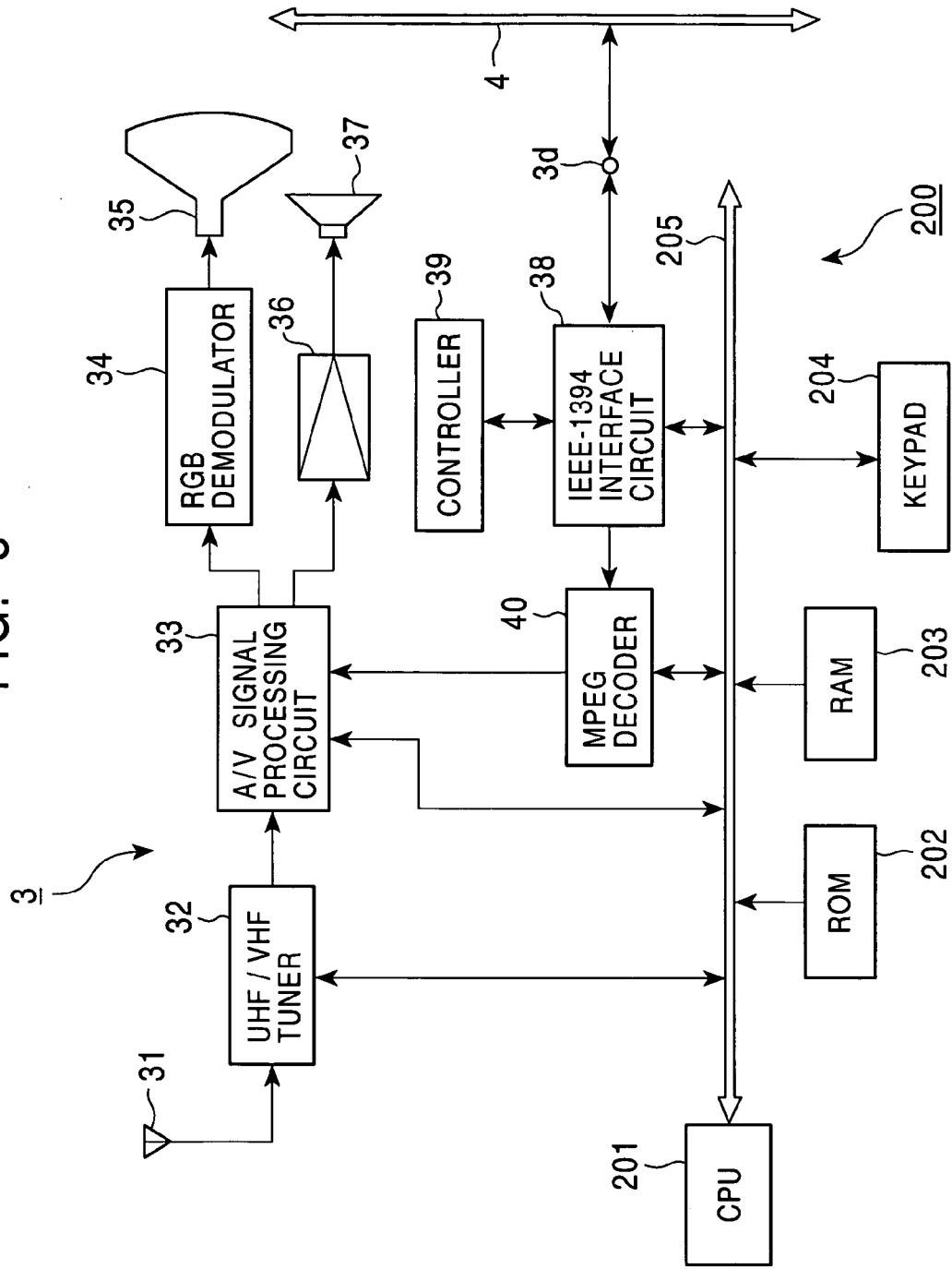
FIG. 5 is a block diagram illustrating a television receiver in the game machine system shown in FIG. 1, according to the embodiment of the present invention.

FIG. 5 is a block diagram illustrating the television receiver 3 used in the game machine system according to the first embodiment. In this television receiver 3 of the present embodiment, ground-wave television broadcasting signal received by an antenna 31 is supplied to a UHF/VHF tuner (hereinafter referred to simply as a tuner) 32.

The tuner 32 selects and demodulates a broadcasting signal specified by a selection control signal generated by a controller 200 in accordance with a selection command input via a keypad 204. The resultant broadcasting signal is supplied to an audio/visual signal processing circuit (hereinafter referred to as an A/V signal processing circuit) 33. The A/V signal processing circuit 33 processes the received video signal and audio signal so as to generate a video signal to be supplied to an RGB demodulator 34 and also generate an audio signal to be supplied to an audio amplifier 36.

The RGB demodulator 34 generates three primary color signals, that is, R (red), G (green), and G (blue) signals, from the received video signal and supplies the resultant R, G, and B signals to a cathode ray tube 35 serving as a display device of the television receiver 3 according to the present embodiment. Thus, the image of the received broadcasting program is displayed on the screen of the cathode ray tube 35.

The audio amplifier 36 generates an analog audio signal to be supplied to a loudspeaker 37 by amplifying the received audio signal and supplies the resultant analog audio signal to the loudspeaker 37. The loudspeaker 37 generates a voice/sound of the received broadcasting program.

The television receiver 3 of this first embodiment further includes a digital input/output terminal 3d, an IEEE-1394 interface circuit 38, a controller 39 for the IEEE-1394 interface circuit 38, and an MPEG decoder 40, thereby allowing image information representing a game image or an audio signal of a game to be received via the digital bus 4 and MPEG-decoded (decompressed). The resultant signal is supplied to the A/V signal processing circuit 33.

That is, it is possible to receive image information from the game machine 1 via the digital bus 4 and display a game image on the screen of the display device 35 of the television receiver 3 in accordance with the received image information. Furthermore, it is possible to generate game sounds/voices for the loudspeaker by supplying the audio signal received from the game machine 1 to the loudspeaker of the television receiver 3.

The MPEG decoder 40 of the television receiver 3 according to the present embodiment also has the capability of synthesizing image data. More specifically, the MPEG decoder 30 can generate an image by combining the image data such as the background image which is directly received in the MPEG-compressed form from the STB 2 via the digital bus 4 and the image data such as a game character which is generated by the game machine 1 and transmitted from the game machine 1 via the digital bus 4. The resultant synthesized image data is supplied to the A/V signal processing circuit 33 to display the game image on the display device 35.

As described above, the television receiver 3 of the present embodiment is connected to the game machine 1 and the STB 2 via the digital bus 4 and has the capability of synthesizing image data whereby the television receiver 3 has not only the capability of simply displaying the image of the supplied image data but also the capability of displaying the synthesized image. In the present embodiment, unlike the conventional technique in which game images are generated only by the game machine, the process of generating game images is distributed among a plurality of devices and thus it becomes possible to present, to users, quick-motion games without reducing the speed of motion.

Furthermore, audio signals used in games may be supplied to the television receiver 3 without being processed by the game machine 1. This allows a reduction in the load upon the game machine 1 and thus it becomes possible for users to enjoy games under better operating conditions.

Operation of the Game Machine System

The operation of the game machine system including the game machine 1, the STB 2, and the television receiver 3 according to the first embodiment is described below with reference to the flow chart shown in FIG. 6.

Figure 6:
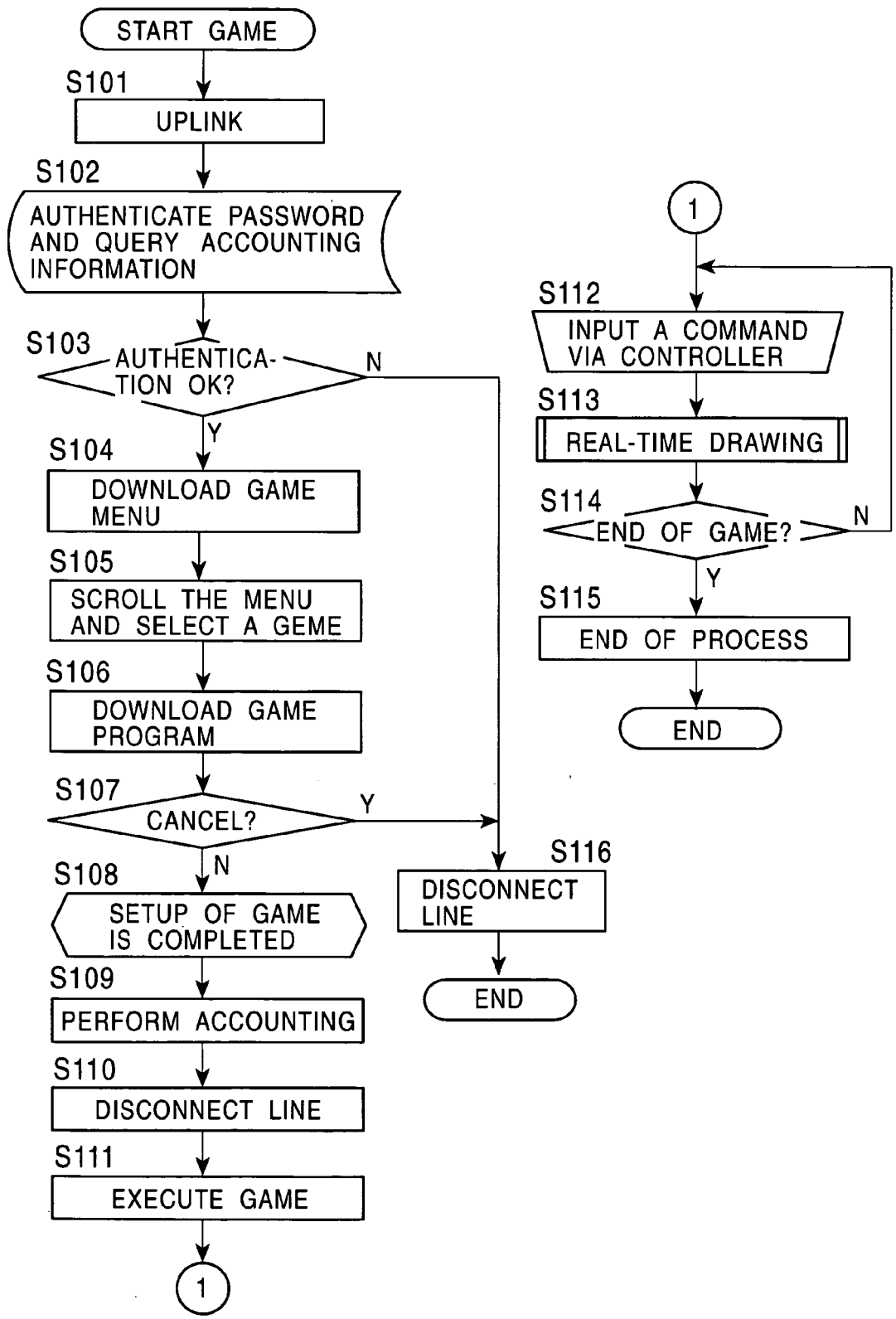
FIG. 6 is flow chart illustrating the operation of the game machine system shown in FIG. 1, according to the embodiment of the present invention.

FIG. 6 illustrates the operation flow associated with the game machine system for the case where game software information is provided from a game provider via digital satellite broadcasting and a game is executed using the provided game software information.

After turning on the electronic power of the game machine 1, the STB 2, and the television receiver 3 connected to the digital bus 2, if a command to transmit a game software information request to a game provider is input via the control unit 11 of the game machine 1, the game machine 1 establishes a telephone line connection with the server of the game provider and performs an uplink process to transmit the game software information request (step S101).

More specifically, in step S101, an uplink program is read from the ROM 17 and executed in response to the command issued by the user via the control unit 11. In accordance with this program, the CPU 15 of the game machine 1 controls the modem 19 so as to make a connection via a telephone line with the server of the game provider. After establishing the communication line, a game selection menu transmission request is transmitted together with the password and/or user identification information of the user to the provider via the established communication line.

If the server of the game provider receives the game selection menu transmission request via the communication line, the server performs user authentication and examines the accounting information on the basis of the password or the user identification information received together with the games election menu transmission request. The result is returned to game machine 1. If the game machine 1 receives the result via the modem 19, the game machine 1 temporarily stores it in the RAM 18 (step S102).

The status or the accounting information (the total fee to be paid for received game software information) indicated by the result of the authentication is output to the television receiver 3 via the IEEE-1394 interface circuit 14 and displayed on the display device 35 of the television 3 thereby informing the user of the status and the total fee to be paid.

If the authentication succeeds, that is, if it is determined that the user who has issued the request for the game selection menu is a user authorized to receive game software information, encryption key information required to descramble the game software information provided via the digital satellite broadcasting is also transmitted from the game provider to the game machine 1 via the communication line, as will be described later.

The CPU 15 of the game machine 1 checks the information, which has been temporarily stored in the RAM after being received from the game provider, to determine whether the authentication has been successfully passed (step S103). If it is determined in step S103 that the authentication has been successfully passed, a game selection menu transmitted from the server of the game provider via the established communication line is downloaded into the RAM 18 of the game machine 1 (step S104).

The game machine 1 supplies the downloaded data of the game selection menu to the television receiver 3 via the digital bus. The game selection menu is displayed in a scrollable fashion on the display device 35 of the television receiver 3 so that the user can select a desired game from the game selection menu (step S105).

More specifically, step S105 is performed as follows:

(1) The CPU 15 of the game machine 1 reads the game selection menu from the RAM 18 and transmits it to the television receiver 3 over the digital bus 4 via the IEEE-1394 interface circuit 14 thereby supplying it to television receiver 3. The television receiver 3 displays the received game selection menu on the display device thereof.

(2) If a scroll command is issued via the control unit 11 of the game machine 1, the scroll command is transmitted to the television receiver 3. In response to the scroll command, the television receiver 3 scrolls the game selection menu so that the user can select a desired game.

(3) If the user presses an Enter key of the control unit 11 of the game machine 1, a request for the game software information of the selected game is transmitted to the server of the game provider via the modem 19 and the telephone communication line maintained in the connected state. Thus, step S105 is completed.

In response to the game software information request received via the communication line, the server of the game provider broadcasts the requested game software information using a broadcasting apparatus. The STB 2 starts receiving and descrambling the broadcasted game software information and storing (downloading) on the hard disk driven by the hard disk drive 29 disposed in the STB 2 (step S106).

In this step, the STB 2 is set in the record mode in which the STB 2 receives the particular predetermined digital satellite broadcasting signal carrying the game software information, and the received digital satellite broadcasting signal is stored on the hard disk of the STB 2.

The descrambling process, in step S106, for decrypting the encrypted game software information supplied via the digital satellite broadcasting is performed using the encryption key information supplied from the game provider via the communication line, as described earlier. This allows only STBs 2 of users whose have passed the authentication based on the password or user identification information to correctly descramble and download game software information into a usable form and store it on hard disks.

After that, it is determined whether a download cancel command indicating that downloading of the requested game software information should be terminated is issued by the user of the game machine system (step S107). If it is determined that the download cancel command is not issued, the requested game software information is entirely downloaded onto the hard disk (step S108).

In the case where the game software information includes an amount of data corresponding to the full capacity of one 650-MB CD-ROM, it takes about 102 sec to download it via digital satellite broadcasting when a BS (broadcasting satellite) is employed, and 153 sec when a CS (communication satellite) is employed.

If the downloading of the desired game software information is completed in step S108, the STB 2 informs the game machine 1 that the downloading has been completed. In response, the game machine 1 informs the server of the game provider, via the modem 19 and the communication line maintained in the connected state, that the downloading of the desired game software information has been completed. At this stage, accounting is performed (step S109).

After that, the CPU 15 of the game machine 1 controls the modem 19 so as to disconnect (release) the communication line (step S110), and executes a game in accordance with the game software information downloaded on the hard disk of the STB 2 step S111). More specifically, a game control program included in the game software information downloaded in the STB 2 is supplied to the game machine 1 via the digital bus 4 and executed by the game machine 1.

In this first embodiment, image data representing the background image of the game is supplied from the STB 2 to the television receiver 3. On the other hand, image data associated with characters in the game is supplied to the game machine 1 and is used by the graphic synthesizer 16 to generate the images of characters. The resultant character images are supplied to the television receiver 3 via the digital bus 4.

The television receiver 3 forms a game image by combining the image data (moving image data) representing the background image received from the STB 2 and the character image data received from the game machine 1. The resultant image data is supplied to the display device 35 of the television receiver 3 and thus the game image is displayed thereon.

Via the above-described process, the game image is displayed on the display device 35 of the television receiver 3. The game machine 1 accepts a command input by the user via the control unit 11 (step S112). In accordance with the game control program and the command given by the user, further image data is supplied to the game machine 1 and the television receiver 3. The game machine 1 generates a character image by means of real-time image generation calculation. Using the resultant character image, the television receiver 3 performs image synthesis and changes the scene of the game (step S113).

Furthermore, it is determined whether a game end command is input by the user (step S114). If the game end command is not input, the process returns to step S112, and steps S112 and S113 are performed repeatedly until the game end command is input. During the iteration of steps S112 and S113, the scene of the game is changed many times in accordance with the game control program and commands given by the user. Thus, the user can enjoy the game.

If it is determined in step S114 that the game end command is issued by the user, an ending process is performed such that the game software information stored on the hard disk of the STB 2 is software-locked or deleted from the hard disk (step S115), and the game is ended.

In the case where it is determined in the decision step S103 that the user is an unauthorized user or in the case where it is determined in the decision step S107 that the download cancel command is issued by the user, the CPU 15 of the game machine 1 controls the modem 19 so as to disconnect (release) the telephone line (step S106) and terminates the process shown in FIG. 6.

In this first embodiment, as described earlier, the audio data used in the game is also supplied from the STB 2 to the television receiver 3. In the television receiver 3, the audio data is decompressed and a voice/sound is generated by the loudspeaker in accordance with the audio data.

In the first embodiment, as described above, when the downloading of game software information to the STB 2 is completed, the game machine 1 access the hard disk of the STB 2 each time the game machine 1 needs the game software information stored on the hard disk and renders a 3D (three-dimensional) or 2D (two-dimensional) image thereby displaying the game image on the display device of the television receiver 3 and thus allowing the user to enjoy the game.

In this first embodiment, because the image data processing and the audio data processing are partially performed by the television receiver 3, the load upon the game machine 1 is reduced. This makes it possible to execute games including quicker-motion game images.

When data is transmitted/received among the game machine 1, the STB 2, and the television receiver 3, control information or the like is transmitted via the digital bus in response to AV/C commands, while image data and audio data are transmitted in the asynchronous mode defined in the IEEE-1394 standard in terms of the digital interface.

If the hard disk for storing game software information has a capacity of 5 GB or greater, game software information including as much information as that stored on a DVD-ROM can be stored on the hard disk.

Because it is not necessary for the game machine itself to include a drive for driving a storage medium on which game software information is stored, the structure of the game machine becomes simple and it becomes possible to reduce the cost of the game machine. Thus in this first embodiment, as shown in FIG. 1, unlike the conventional game machine including the drive for driving a storage medium on which game software information is stored, the main unit of the game machine is not required to have such a drive, and the game machine can be made up of only the control unit usually called a game controller.

Furthermore, the STB 2 used to acquire game software information via digital satellite broadcasting, store it on the hard disk, and supply it to the game machine 1 or the television receiver 3 also has the capability of receiving ordinal digital satellite broadcasting programs. That is, the STB 2 is provided not only to obtain game software information via digital satellite broadcasting but to receive digital satellite broadcasting programs. Therefore, the STB 2 does not become useless even when games are not executed.

STBs 2 and hard disk drives 29 may be sold separately so that users can attach a hard disk drive 29 to his/her STB 2 if the hard disk drive 29 is necessary. This prevents the users who do not want to acquire game software information from having to buy expensive STBs 2. In this case, the hard disk drive 29 should of the type which can be attached by the user to the STB 2.

Another advantage is that because game software information is provided via digital satellite broadcasting having a large transmission capacity, a great reduction in the communication cost needed to acquire game software information is achieved, compared with the communication cost needed when a communication line with small transmission capacity is used.

Furthermore, the user can select a desired game from a large number of games available from the game provider. This is very convenient for the user. Furthermore, the user can purchase desired game software information on line without having to visit a shop to purchase a game software package. This is also very convenient for the user.

In the ending process in step S115 shown in the flow chart of FIG. 6, the game software information is held on the hard disk of the STB 2 after being software-locked or removed from the hard disk of the STB 2. When the game software information is software-locked, it is required to input new key information each time the game software information is used.

In the case where game software information is software-locked, when the user wants to use the software-locked game software information, the user acquires key information from the game provider via a telephone line and releases the software lock using the acquired key information thereby making the game software information usable. In this case, an accounting may be performed each time key information for releasing the software lock is provided.

In the case where game software information is deleted each time the game is ended, when the user wants to use the same game software information, it is necessary to again receive the game software information. The game provider may charge the providing of game software information each time the game provider provides game software information.

Because usage of game software information is charged each time game software information is used, the user can enjoy games in a similar manner as if the user were enjoying games in an amusement arcade.

The game provider may present explanations of games, or may present sample game software information which is allowed to be executed for predetermined particular periods of time so that users can purchase only game software information which pleased the user.

The explanations or the sample game software information may be provided via telephone lines or digital satellite broadcasting. This prevents users from spending money for useless games.

Hard disks can be brought into an operating state from a standby state in a short time, and a short seek time is required in random access, compared to CD-ROMs and DVDs. Therefore, the use of hard disk to store game software information allows desired data such as image data to be quickly read from the hard disk and transmitted, compared with the case where a CD-ROM or a DVD is used to store game software information. Thus, it is possible to execute games including quick-motion images without causing a reduction in the speed of the games.

Second Embodiment

In the above-described game machine system according to the first embodiment, the game machine 1, the STB 2, and the television receiver 3 are connected to each other via the digital bus, that is via a cable. However, in some cases, the digital bus line extending in a room to connect the devices to each other is obstructive.

In particular, the location of the game machine system is limited by the connection of the modem disposed in the game machine 1 to a telephone modular jack disposed at a particular fixed position on a wall of a room. In the game machine system according to this second embodiment, the above problem is avoided by connecting the respective devices via a wireless communication channel. This makes it unnecessary to use a digital bus line in the form of a cable which can be obstructive and can limit the locations where the devices of the game machine system are placed.

Figure 7:
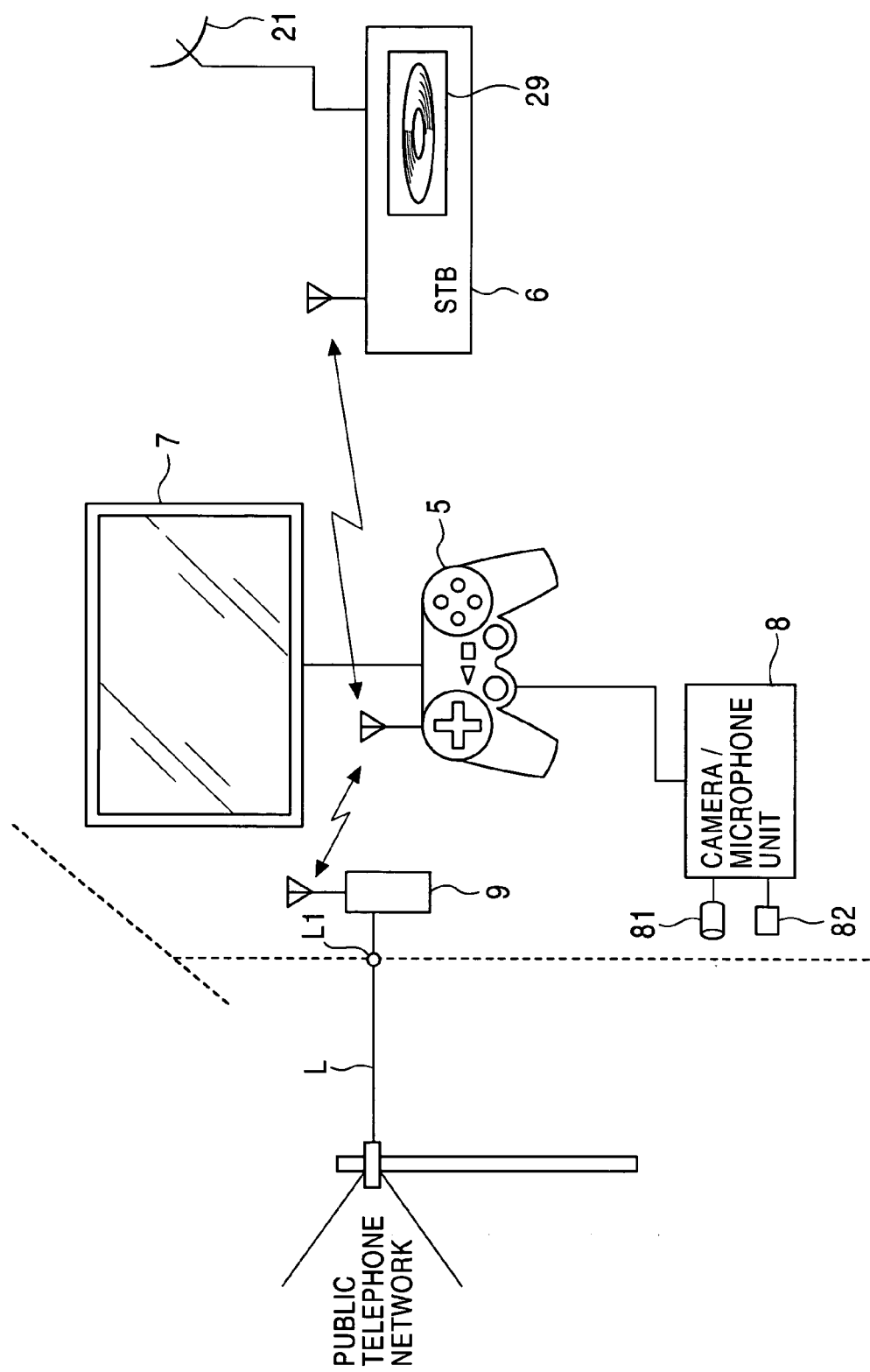
FIG. 7 is a schematic diagram illustrating another embodiment of a game machine system according to the present invention.

FIG. 7 illustrates the game machine system according to the second embodiment. In this second embodiment, as will be described later in further detail, the game machine system includes a game machine 5 and an STB 6 both having a wireless communication capability. In this second embodiment, as shown in FIG. 7, an interior wireless LAN unit 9 including a modem disposed therein is connected to a modular jack L1 connected to a telephone line L.

The interior wireless LAN unit 9 and the game machine 5 of the second embodiment are coupled to each other by means of wireless communication, and the game machine 5 and the STB 6 are coupled to each other by means of wireless communication. Thus, the game machine system is realized in the form of a wireless LAN system.

In this second embodiment, a television receiver 7 of the analog type is connected to the game machine 5 via an analog transmission cable. When a user plays a game, the user operates the game machine 5 while viewing the game screen displayed on the television receiver 7. Therefore, the game machine 5 and the television receiver 7 are always at close locations when used. Therefore, the game machine 5 and the television receiver 7 are connected to each other via the analog transmission cable.

A camera/microphone unit 8 is similar to the camera/microphone unit 8 employed in the first embodiment described above. The camera/microphone unit 8 is generally used at a location close to the game machine 5, and thus it is connected to the game machine 1 via a cable. When the camera/microphone unit 8 is not used, it may be disconnected from the game machine 5.

The game machine system of this second embodiment operates in a similar manner to that of the first embodiment described above except that the communication between the game machine 5 and the interior wireless LAN unit 9 including the built-in modem and the communication between the game machine 5 and the STB 6 are performed by means of wireless communication.

Also in this game machine system in the form of the wireless LAN system, data can be transmitted/received at a sufficiently high speed. The data transmission rate of this game machine system (wireless LAN system) of this second embodiment is described below.

DVD-ROM and CD-ROM are widely used as storage media for storing game software information. When a DVD-ROM is used, the maximum data transmission rate is 1 to 5 times the standard rate, more specifically, 1.35 MB/s to 6.75 MB/s. In the case where a CD-ROM is used, the maximum data transmission rate is 2 to 32 times the standard rate, and more specifically, 0.3 MB/s to 4.8 MB/s.

In view of the above, one choice as to the range of transmission rate is to employ a range of 2.4 Mbps (0.3 MB/s) to 54 Mbps (6.75 MB/s). However, in practical games using CD-ROMs, the range of 4 to 8 times the standard rate is recommended as the data transmission rate, and thus it is sufficient for the wireless LAN system if the range is set to be 4.8 bps (0.6 MB/s) to 9.6 Mbps (1.2 MB/s).

For use in Japan, although only one channel of 2.4 GHz band is permitted for the wireless LAN, a rather high transmission rate of 2 Mbps to 10 Mbps is allowed, and thus it is possible to transmit moving image data and audio data included in game software information.

In Japan, there is a plan for assigning three channels to the wireless LAN. Thus, it is expected that the transmission rate will be increased to 3 times the current transmission rate, that is 6 Mbps to 30 Mbps. This will allow a larger amount of data to be transmitted. Any way, the game machine system similar to that according the first embodiment can also be achieved by connecting the game machine and the STB via the wireless LAN.

In this second embodiment, communication via the wireless LAN system is performed in accordance to the DSSS (Direct Sequence Spread Spectrum) method, and the transmission protocol according to the IEEE-802.1 standard is used. In this method, indoor transmission is possible within a range of 30 m to 300 m. The communication method and the protocol are not limited to those employed herein, but other communication methods an protocols may also be employed.

Now, the game machine 5, the STB 6, the television receiver 7, and the interior LAN unit 9 of the game machine system capable of performing high-speed transmission via the wireless LAN according to the second embodiment are described below.

Game Machine

Figure 8:
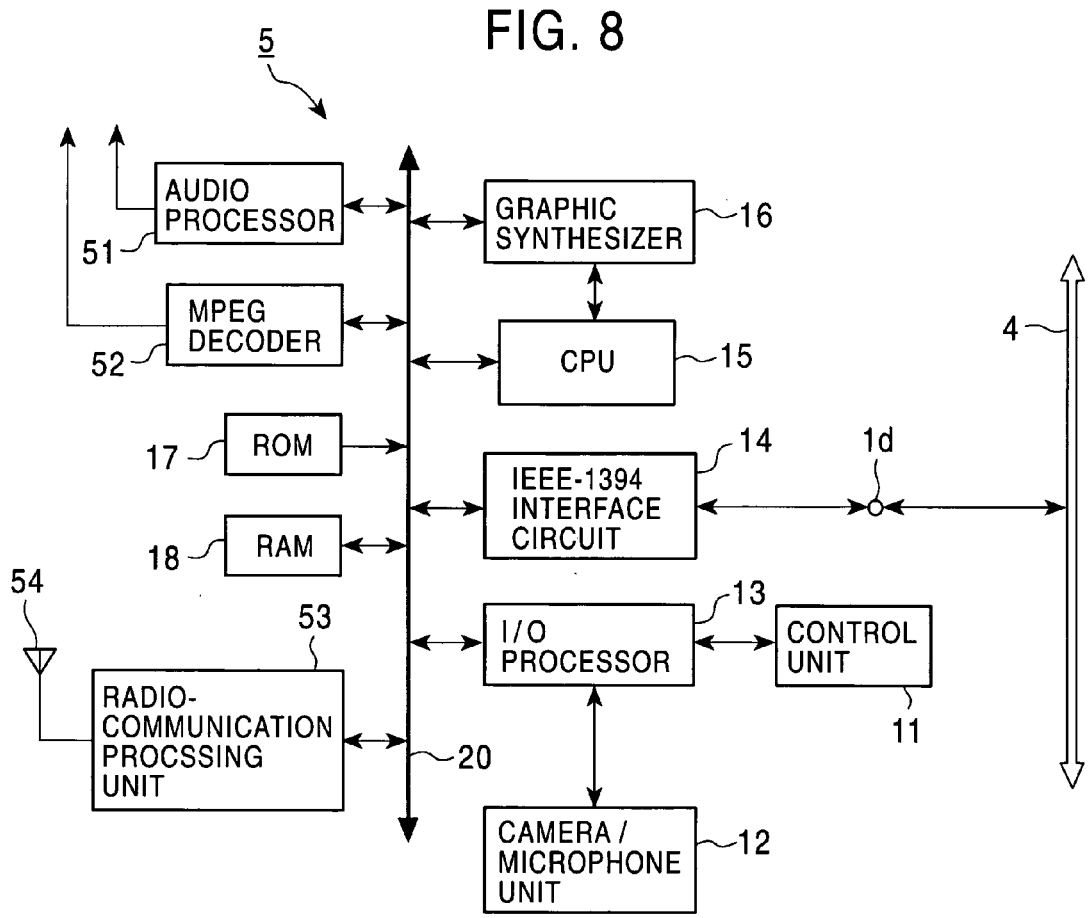
FIG. 8 is a block diagram illustrating a game machine in the game machine system shown in FIG. 7, according to the embodiment of the present invention.

FIG. 8 is a block diagram illustrating the game machine 5 of the second embodiment. As shown in FIG. 8, the game machine 5 of the second embodiment is similar to the game machine 1 of the first embodiment described above with reference to FIG. 3 except that the game machine 5 further includes an audio processor 51, an MPEG decoder 52, a wireless communication processing unit 53, and a transmitting/receiving antenna 54. Therefore, in this game machine according to the second embodiment, similar parts to those of the game machine 1 of the first embodiment are denoted by similar reference numerals and they are not described in further detail herein.

In the game machine 5 of this second embodiment, the audio processor 51, as will be described in further detail later, decompresses audio data used in a game, supplied from the STB 6 via the wireless communication, and converts it from digital to analog form thereby generating an analog audio signal. The resultant analog audio signal is supplied to the analog television receiver 7 connected via the analog transmission cable.

The MPEG decoder 52 decompresses image data such as a background image and a character image used in the game, supplied from the STB 6 via the wireless communication. The MPEG decoder 52 also produces an image synthesized from a background image and a game character image and converts the produced image from digital form into analog form thereby producing an analog image signal representing a game image. The resultant analog image signal is supplied to the analog television 7 via the analog transmission cable.

The game machine 5 of the second embodiment, as described earlier, also includes the interior LAN unit 9 connected to the modular jack L1 of the telephone line and further includes the wireless communication processing unit 53 for communicating with the STB 6. Control information and other data are transmitted and received to and from various devices via the wireless communication processing unit 53.

Figure 9:
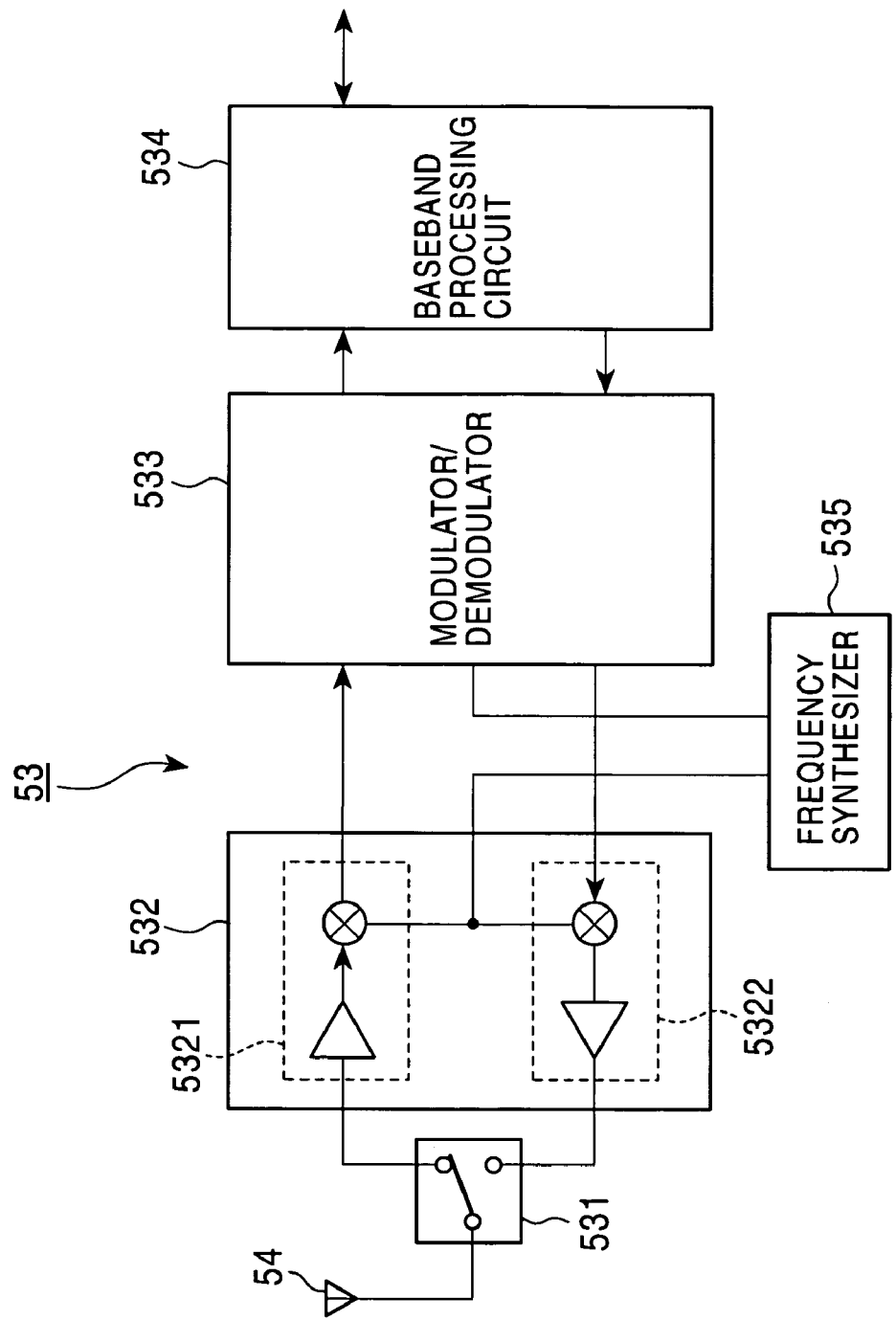
FIG. 9 is a block diagram illustrating a wireless communication processing unit in the game machine shown in FIG. 8, according to the embodiment of the present invention.

FIG. 9 is a block diagram illustrating the wireless communication processing unit 53 of the game machine 5. As shown in FIG. 9, the wireless communication processing unit 53 of the second embodiment includes an antenna duplexer 531, a transmitting/receiving circuit 532, a modulator/demodulator 533, a baseband processing circuit 534, and a frequency synthesizer 535.

The antenna 54 connected to the antenna duplexer 531 is used for both transmission and reception. That is, the antenna 54 receives an incoming signal and transmits a signal output from the wireless communication processing unit 53. The antenna duplexer 531 serves to prevent interference between the signal output from the wireless communication processing unit 53 and the signal received by the antenna.

The transmitting/receiving circuit 532 disposed at the stage following the antenna duplexer 531 includes a receiving circuit 5321 and a transmitting circuit 5322. The receiving circuit 5321 amplifies the received signal to a predetermined level and selectively passes a signal at a particular frequency specified by the frequency synthesizer which will be described later. The output signal with the selected frequency is supplied to the modulator/demodulator 533.

The transmitting circuit 5322 adjusts the frequency of the modulated signal to be transmitted, supplied from the modulator/demodulator 533, in accordance with a control signal output from the frequency synthesizer 535 which will be described later. The transmitting circuit 5322 then amplifies the signal to be transmitted and transmits it via the antenna duplexer 531 and further via the antenna 54.

The modulator/demodulator 533 demodulates the received signal supplied from the receiving circuit 5321 of the transmitting/receiving circuit 532 and supplies the resultant demodulated signal to the baseband processing circuit 534. The modulator/demodulator 533 also modulates the signal to be transmitted, supplied from the baseband processing circuit 534 and supplies the resultant modulated signal to the transmitting circuit 5322 of the transmitting/receiving circuit 532.

The baseband processing circuit 534 extracts an original baseband signal from the demodulated signal output from the modulator/demodulator 533. The extracted baseband signal is supplied to the control unit including the CPU 15 in the game machine 5. On the other hand, when a baseband signal to be transmitted is supplied to the baseband processing circuit 534 via the CPU bus 20, the baseband processing circuit 534 removes unnecessary frequency components and supplies the resultant signal to the modulator/demodulator 533. The modulator/demodulator 533 modules the signal supplied from the baseband processing circuit 534, and the resultant signal is transmitted.

The frequency synthesizer 535, as described earlier, specifies the frequency of the signal which should be selectively received and also specifies the frequency of the signal to be transmitted. In this second embodiment, the operations of the respective parts such as the antenna duplexer 531 and the frequency synthesizer 535 are controlled by the CPU 15 of the game machine 5.

In the game machine 5 of the second embodiment, as described above, the use of the wireless communication processing unit 53 allows various kinds of data such as control data, image data, and audio data to be transmitted and received to and from the interior wireless LAN unit 9 including the modem and to and from the STB 6 by means of wireless communication.

Thus, as with game machine system according to the first embodiment, the game machine 5 can make a connection with the server of a game provider via a telephone communication line by controlling the interior wireless LAN unit 9 and can transmit a game selection menu request. After authentication, the game selection menu is supplied to the game machine 5. The game machine 5 can then transmit a request for game software information selected from the game selection menu.

Also in this second embodiment, as will be described later, the STB 6 includes a wireless communication processing unit similar to that of the game machine 5 so that the STB 6 can transmit and receive various kinds of data such as control data, image data, and audio data to and from the game machine 5 by means of wireless communication.

STB 6

Figure 10:
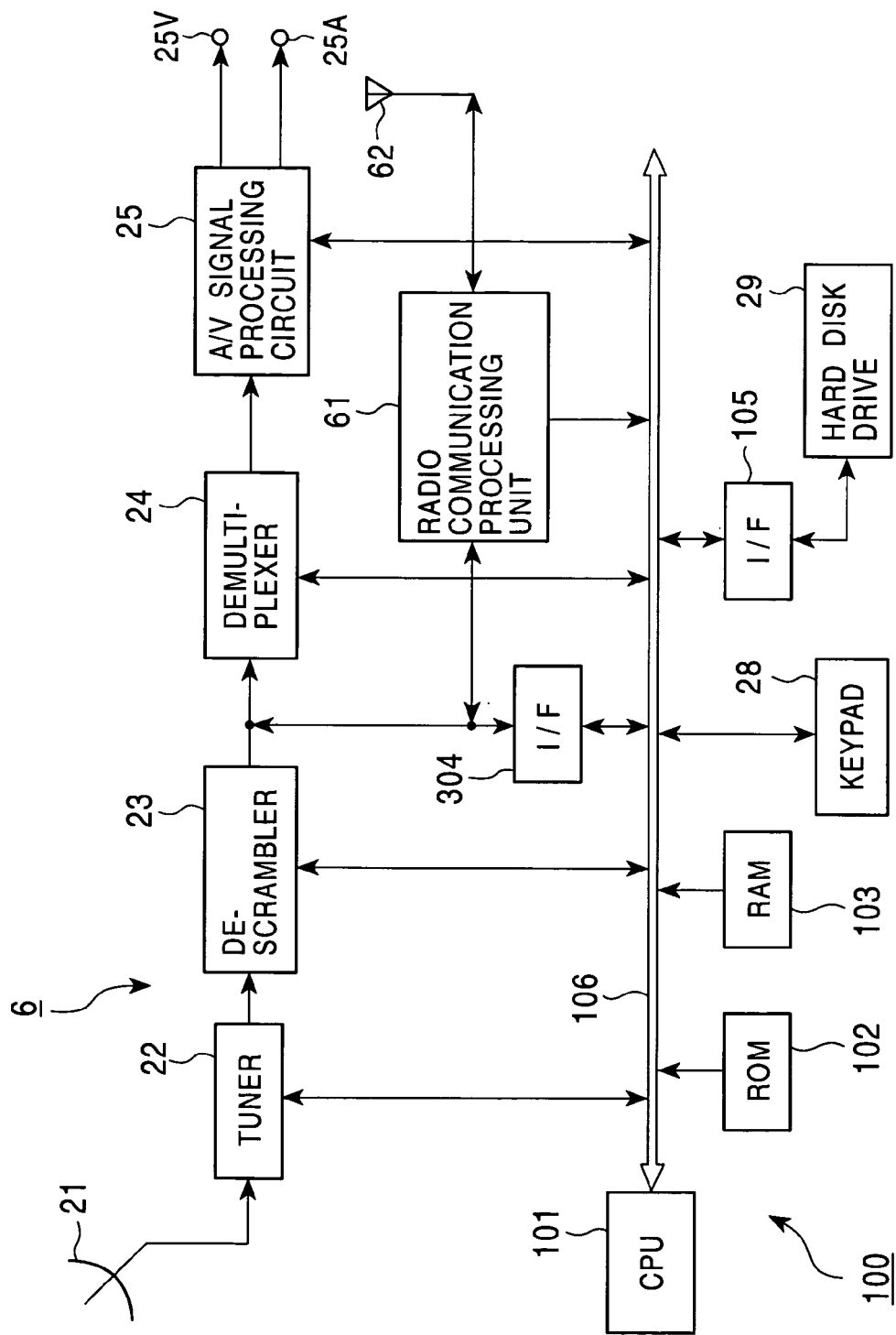
FIG. 10 is a block diagram illustrating an STB (set to box) in the game machine system shown in FIG. 7, according to the embodiment of the present invention.

FIG. 10 is a block diagram illustrating the STB 6 according to the second embodiment. As shown in FIG. 10, the STB 6 according to the second embodiment is similar to the STB 2 according to the first embodiment described earlier with reference to FIG. 4 except that the STB 6 further includes a wireless communication processing unit 61 and a transmitting/receiving antenna 62. Therefore, in this STB 6 according to the second embodiment, similar parts to those of the STB 2 according to the first embodiment are denoted by similar reference numerals, and they are not described further herein.

In the STB 6 of this second embodiment, the wireless communication processing unit 61 is configured in a similar manner to the wireless communication processing unit 53 of the game machine 5 described above with reference to FIG. 9. That is, the wireless communication processing unit 61 of the STB 6 includes an antenna duplexer 531, a transmitting/receiving circuit 532, and modulator/demodulator 533, a baseband processing circuit 534, and a frequency synthesizer 535.

Furthermore, as in the STB 2 according to the first embodiment, the STB 6 according to the second embodiment is capable of receiving game software information which is provided via digital satellite broadcasting in response to a request, issued from the game machine 5, for transmission of game software information and is capable of storing the received game software information on a hard disk driven by the hard disk drive 29.

In this second embodiment, the game machine 5 transmits a message to the STB 6 via wireless communication to request transmission of necessary information, such as a game control program, image data, and audio data, included in game software information stored on the hard disk of the STB 6. In response to the request, the STB 6 extracts the requested data from the hard disk and transmits the extracted data to the game machine 5 via wireless communication.

In the STB 6 of the second embodiment, as described above, the use of the wireless communication processing unit 61 allows the STB 6 to be connected to the game machine 5 via wireless communication thereby allowing various kinds of data such as control data, image data, and audio data to be transmitted and received to and from the game machine 5. More specifically, this makes it possible for the game machine 5 to access, via wireless communication, the game software information stored on the hard disk of the STB 6.

Analog Television Receiver

Figure 11:
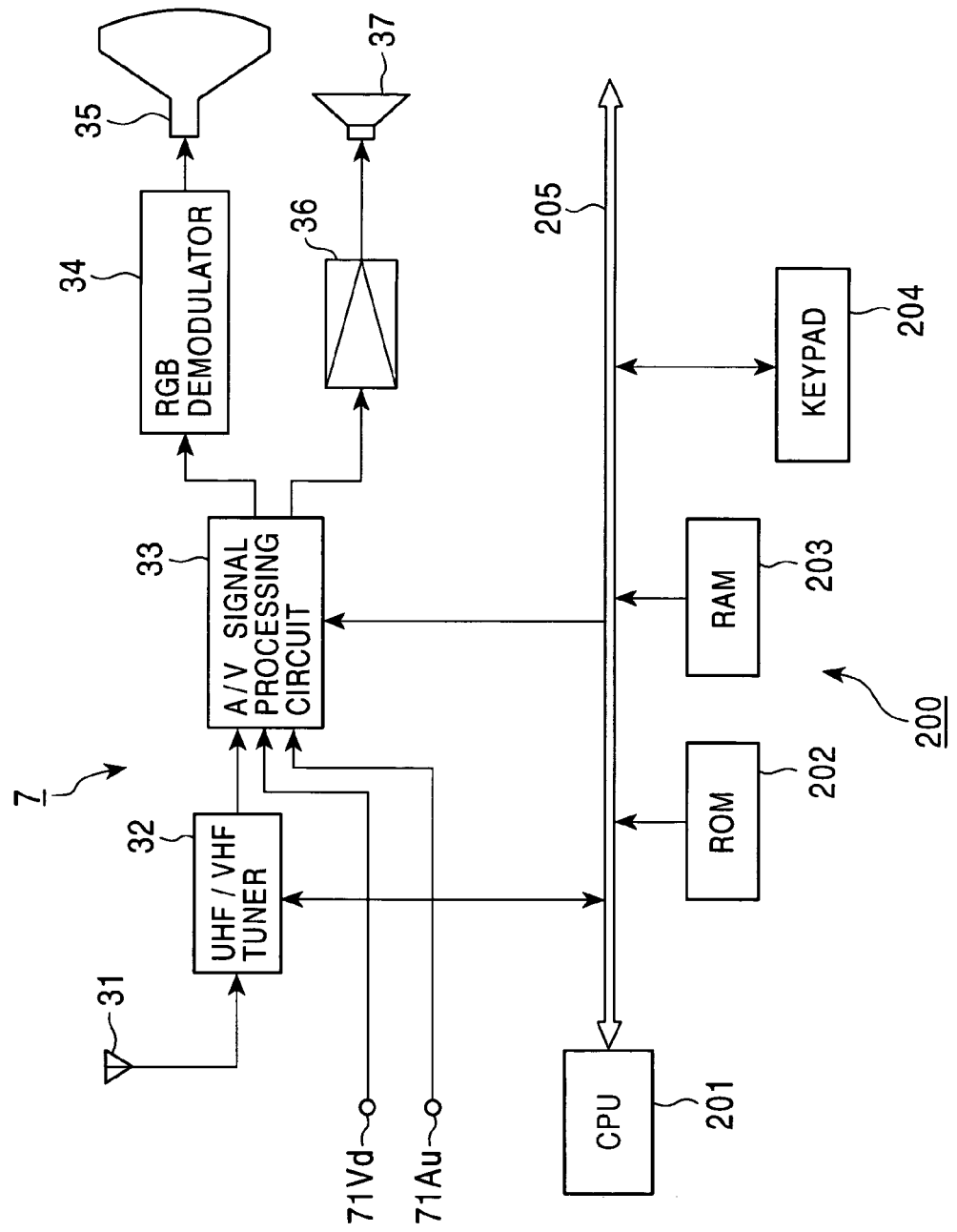
FIG. 11 is a block diagram illustrating a television receiver in the game machine system shown in FIG. 7, according to the embodiment of the present invention.

FIG. 11 is a block diagram illustrating the analog television receiver 7 used in the game machine system according to the second embodiment. In this analog television receiver 7 according to the second embodiment, similar parts to those of the television receiver 3 according to the first embodiment described above are denoted by similar reference numerals and they are not described further herein.

In this second embodiment, as described above, the television receiver is connected to the game machine 5 via the analog communication cable. The television receiver used in the first embodiment includes the IEEE-1394 interface circuit and the MPEG decoder and operates as a digital television receiver. In contrast, the analog television receiver used in this second embodiment is of the conventional type and does not have the capability of processing digital signals.

The analog television receiver 7 used in the second embodiment has an analog image signal input terminal 71Vd for inputting an analog image signal supplied from the game machine 5 and also has an analog audio signal input terminal 71Au for inputting an analog audio signal supplied from the game machine 5.

The analog image signal and the analog audio signal received via the analog image signal input terminal 71Vd and the analog audio signal input terminal 71Au are supplied to an A/V signal processing circuit 33. After processed by the A/V signal processing circuit 33, the analog image signal is supplied to an RGB demodulator 34, which generates three primary color signals and supplies them to a display device 35. On the other hand, the analog audio signal processed by the A/V signal processing circuit 33 is supplied to a loudspeaker 39 via an audio amplifier 38.

As described above, the analog television receiver 7 of the second embodiment displays a game image and generates a game sound/voice in accordance with the analog image signal and the analog audio signal supplied from the game machine 5.

Interior Wireless LAN Unit

The interior wireless LAN unit 9 of the second embodiment includes the modem and the wireless communication processing unit described earlier with reference to FIG. 9 and is connected to the modular jack L1 of the telephone drop L extending from the outside into the inside of a house. The interior wireless LAN unit 9 according to this second embodiment communicates with the game machine 5 by means of wireless communication and makes a connection with the server of the game provider via a communication line whereby various requests issued by the game machine 5 are transmitted to the server of the game provider and a game selection menu received from the game provider is transmitted to the game machine 5.

Operation of the Game Machine System According to the Second Embodiment

In this second embodiment, the game machine system is made up of the game machine 5, the STB 6, the television receiver 7, and the interior wireless unit 9 and operates in a similar manner to the game machine system described above with reference to the flow chart shown in FIG. 6, except for some differences.

The game machine system according to the second embodiment is different from that of the first embodiment in that the interior wireless LAN unit 9 having the modem and the game machine 5 are connected with each other via a wireless communication channel, and the game machine 5 and the STB 6 are connected with each other also via a wireless communication channel, whereby various kinds of data are transmitted by means of wireless communication.

Furthermore, in this second embodiment, the game machine 6 and the analog television receiver 7 are connected with each other via an analog cable, and all processes for generating game images such as generation of a character, synthesis of an image from the generated character and a background image, and rendering of an image are performed by the game machine 5. Audio signals used in games are also processed by the game machine 5, and the resultant analog audio signals are supplied to the television receiver 7.

Thus, the television receiver 7 simply displays a game image and generates a game sound/voice in accordance with the analog image signal and the analog audio signal supplied from the game machine 5, without performing image processing such as image synthesis.

In this second embodiment, a cable for connection between the game machine 5 and the modular jack of the telephone line is unnecessary. Furthermore, a digital bus line for connection between the game machine 5 and the STB 6 is unnecessary. Thus, there is no interconnection cable which would be obstructive.

In the convention system, the connection to a telephone line via a cable limits the location where the game machine system is installed. In contrast, in the present embodiment, devices making up the game machine system can be freely installed at desired locations in a house without encountering the limitation described above.

In this second embodiment, as in the first embodiment described earlier, various advantages such as a reduction in the cost of the game machine, a reduction in communication cost required to receive game software information, and an increase in convenience in use of games are achieved.

Also in this second embodiment, it is possible to provide a network communication game service in which payment is performed on a pay-per-use basis. Furthermore, the game provider may provide explanations of games or may provide sample game software information which is allowed to be executed for predetermined particular periods of time so that users can purchase only game software information which pleased the user.

In the second embodiment described above, the game machine 5 and the television receiver 7 are connected to each other via the analog cable. However, the connection is not limited to that via an analog cable. The game machine 5 and the television receiver 7 may be connected to each other via a digital wireless communication channel. In this case, a wireless communication processing unit and an MPEG decoder similar to those shown in FIG. 9 are disposed in the television receiver 7, thereby making it possible for the television receiver 7 to perform various kinds of processing such as decompression of compressed digital data, synthesis of an image, and processing of a digital audio signal, as in the first embodiment.

Alternatively, the interior wireless communication unit 9 and the game machine 5 may be connected to each other via a wireless communication channel, while the connections between the game machine 5 and the STB 6 and between the game machine 5 and the television receiver 7 may be realized by a digital bus. This simple connection method allows the components of the game machine system to be relatively freely located without causing a significant limitation in the locations.

Accounting

In the first and second embodiments, accounting is performed when the game provider receives, via a communication line, a message informing that game software information which is supplied from a game provide via broadcasting in response to a request issued by the user of the game machine system has been completely stored on the hard disk of the STB of the game machine system.

When a game is ended, the game software information provided by the game provider is removed from the hard disk or software-locked so that when the user wants to play the same game, the user has to receive the same game software information or key information used to release the software lock.

That is, accounting is performed each time game software information is stored on the hard disk of the STB or each time key information required for releasing the software lock of game software information remaining on the hard disk of the STB is received, thereby allowing the user to enjoy games on a pay-per-play basis in a similar manner as if the user were enjoying games in an amusement arcade.

However, the manner of accounting is not limited to that described above. For example, accounting may also be performed as follows. Each time a command to execute a particular game is input via the control unit 11 of the game machine, the CPU of the game machine updates the game usage history information by storing the identification information of the game and the number of times the game has been used in a memory such as a RAM disposed in the game machine. If the same game is used at a plurality of times, the number of times the games has been used is updated.

Each time game software information is started to be used, or at predetermined intervals, for example, once a day, a week or a month, the game machine system is connected to the server of the game provider via a communication line, and the game usage history information is transmitted to the server of the game provider via the communication line.

In accordance with the received game usage history information, the server of the game provider performs accounting. That is, the server of the game provider calculates the game usage fee in accordance with the number of times the game has been used described in the game usage history information, and bills the user of the game machine.

Alternatively, the game provider may make a connection of a communication line with the game machine system to which game software information has been provided by the game provider and may transmit a request for transmission of the game usage history information to acquire the game usage history information from the game machine system.

As described above, the storing of the game usage history information in the memory of the game machine makes it possible to charge each usage of a game. The memory for storing the game usage history information, the modem for communication via the communication line, and the means for transmission of the game usage history information via the modem and the communication line are not necessarily required to be disposed in the game machine. Instead, they may be disposed in the STB or the television receiver or in one of the other devices connected to the digital communication line in the home network system.

Alternatively, the memory for storing the game usage history information, the modem for communication via the communication line, and the means for transmission of the game usage history information via the modem and the communication line may be disposed separately in different devices connected to the home network system. Still alternatively, a device having all or part of the above functions is constructed, and it may be connected to the home network system.

The game provide may sell a prepaid card which allows a user to enjoy playing a game a number of times depending upon the price of the prepaid card and specified by data described on the prepaid card. A prepaid card reader/writer capable of rewriting prepaid cards is disposed in one of devices making up the game machine system or in one of devices connected to the home network system.

Each time a game is used, that is, each time a command to execute a particular game is input via the control unit 11 of the game machine, the number of times games can be played, described on the prepaid card, is decremented. That is, the accounting is performed by the game machine depending upon the usage of games.

As described above, instead of performing the accounting when game software information is stored on a hard disk, the accounting may be performed when game software information is used. Although in the above examples, the accounting is performed in accordance with the number of times game software information has been used, the accounting may also be performed in accordance with the length of time game software information has been used.

In the first and second embodiments described above, when the game provider receives a game software information transmission request issued by a user via a communication line, the game provider transmits the requested game software information by means of broadcasting. However, the manner of providing game software information is not limited to that described in the first and second embodiments.

For example, game software information may be distributed free of charge by means of broadcasting in a similar manner as television programs are broadcasted by means of conventional analog television broadcasting/A user may check a program table describing when game software information is to be broadcasted and may download desired game software information on the hard disk of the STB of the user. In this case, the user is not needed to transmit a game software information transmission request via a telephone line.

Alternatively, a user may purchase a memory card such a magnetic card on which a password or user identification information is stored, and a card reader for reading information form the memory card may be connected to the game machine 1 or the STB 2 thereby allowing the user to receive as much game software information as the price which has been paid to obtain the memory card.

Additional information associated with selectable information such as characters, background images, the colors of characters, the colors of background images, and voices which can be selected and used in games may be downloaded from libraries provided by the game provider whenever the user wants to get additional information thereby allowing selectable information such as characters, background images, and voices of the previously provided game software information to be replaced with downloaded additional information.

In the case of conventional package media, information provided is limited by the limitation in the capacity of the media. In contrast, in the present invention, desired additional information associated with selectable information can be acquired whenever it is needed, and thus the user can easily modify games presented by game software information into forms desired by the user and also can upgrade the games.

The selectable information is not limited to characters, background images, the colors of characters, the colors of background images, and voices. The selectable information may further include a program used to increase the game speed, a program used to increase the number of characters in games, and other information which may be selectively used by the user.

Furthermore, the user can receive an advice for win a game or issue a question about the game via the communication line as required. Furthermore, other services such as supplying of help information may be provided on line or via electronic mail.

Various types of electronic devices such as a videocassette recorder, a DVD recorder/player, or a digital videocassette recorder may be connected to the home network system including the game machine, the STB, and the television receiver. In this case, the game machine may be used as a remote control unit for controlling the respective devices connected to the home network system.

In the embodiments described above, the STB 2 or 5 serves as a home network server. This makes it possible for a plurality of users to enjoy a game using a plurality of game machines at the same time. It becomes also possible to play music (BGM) using an AV device connected to the home network. Furthermore, it is also possible to divide the screen into a plurality of windows and display a game image and a television image or video image in different windows.

When any game is not played, the system may be connected to the Internet to access home pages in a similar manner as with a usual home computer. That is, the system may be used as a so-called Web television set. Furthermore, visual/voice mail may be may be sent using the camera/microphone unit.

The digital serial bus according to the IEEE-1394 standard is employed to form the home network in the first embodiment described above, while the wireless LAN using the DSSS as the communication method and using the communication protocol according to the IEEE-801.11 is employed in the second embodiment. However, the manner of forming the home network is not limited to those. Various types of digital buses and various types of wireless LANs may also be employed to form the home network.

Furthermore, a mixture of different communication techniques may be used to form the game machine system (home network system). For example, some devices may be connected to the home network via a digital serial bus and other devices may be connected via a wireless LAN. Another example is to use a mixture of an analog communication line and a digital communication line as in the above-described second embodiment in which the game machine and the display device is connected via the analog communication line and the other devices are connected via the digital communication line.

Although in the embodiments described above, game software information is provided by means of digital satellite broadcasting, the means of providing game software information is not limited to the digital satellite broadcasting. For example, game software information may also be provided via ground-wave digital broadcasting or a dedicated communication line such as that used for cable broadcasting.

It is possible to provide, via broadcasting, a wide variety of game software information ranging from short-time games such as those provided in amusement arcades to long-time games such as role-playing games. The game providing fee may be varied depending upon the amount of data of game software information.

Although in the embodiments described above, the modem is disposed in the game machine 1 or the interior wireless LAN unit 9, the modem may be disposed in the STB or the television receiver.

The communication line for connection between the game machine and the game provider may be of one of various types of communication lines, such as a telephone line or the Internet.

As can be understood from the above description, the present invention has great advantages. That is, the game machine is not necessary to include a drive for reading game software information stored on a storage medium, and thus the cost of the game machine can be reduced.

Furthermore, the present invention makes it possible to for users to easily acquire desired game software information at low cost. The game provider can perform accounting each time the game provider provides game software information.

In the game machine system according to the present invention, the functions of the game machine are distributed among various devices while they are controlled in a centralized fashion thereby providing an environment which allows the user to enjoy various games called television games or computer games at home at low cost.

What is claimed is:

1. A game machine system comprising a set top box (STB) device including means for receiving a digital television satellite broadcast signal and for supplying television program data corresponding to the received digital television satellite broadcast signal to a display device, the STB device including information processing means and drive means, the game machine system also comprising the display device and a game executing device configured as a game controller without means for storing game software on a driven storage medium, the STB device, the display device, and the game executing device being connected to each other to form the game machine system via a digital communication line that is completely external to each of the STB device, the display device, and the game executing device, said game machine system further comprising, game selection command input means in said game executing device for inputting a game selection command to select a specified game from a remote game software provider;

a game selection request transmission means in said game executing device for transmitting said game selection command to said remote game software provider via a communications media separate from the completely external digital communication line, said remote game software provider including means for receiving said game selection request via the communications media separate from the completely external digital communication line and means for transmitting said specified game indicated by said game selection command to said STB device as part of said digital television broadcast signal;

said STB device including game software information acquisition means for acquiring said game software information from the specified game transmission by the remote game provider transmitting means and for storing the acquired game software information corresponding to said specified game in said drive means;

game control command input means in said game executing device for inputting a game control command;

information request transmission means in said game executing device for transmitting a game request corresponding to said game control command from said game executing device to said STB device over said completely external digital communication line for commanding said information processing means in said STB device to provide the specified game information from said drive means to said game executing device over said completely external digital communication line;

information acquisition means in said game executing device for acquiring said transmitted specified game information from said information processing means in said STB device via said completely external digital communication line;

image information generating means in said game executing device for generating image information in accordance with game display data included in said specified game information acquired via said information acquisition means and transmitting the generated image information over said completely external digital communication line to said display device;

image information acquisition means in said display device for acquiring the image information representing the generated image information transmitted via said completely external digital communication line; and image displaying means in said display device for displaying an image in according with the generated image information acquired via said image information acquisition means.

2. A game machine system according to claim 1, wherein said image information acquisition means of said display device acquires data-compressed image information transmitted from said information processing means in said STB device over said completely exterior digital communication line and also the generated image information data-compressed by said image information generating means from said completely exterior digital communication line, and said display device further comprises:

decompression means for decompressing the data-compressed image information acquired by said image information acquisition means from said information processing means in said STB device and from said image information generating means; and image synthesizing means for synthesizing an image from the image represented by the image information which has been decompressed by said decompression means.

3. A game machine system according to claim 1, wherein said information processing means included in the STB device further comprises:

additional information acquisition means for acquiring additional information associated with information used in a particular game and storing said additional information in said drive means, said additional information being supplied by means of broadcasting or via a dedicated communication line; and additional information processing and transmission means for reading said additional information from said drive means in response to an additional information providing request received via said completely exterior digital communication line and then transmitting said additional information read from said drive means over said completely exterior digital communication line instead of original information used in the particular game;

said game executing device further comprising:

additional information selection command input means for inputting an additional information selection command specifying the additional information to be used instead of original information used in the particular game; and additional information request transmission means for transmitting a request for the additional information specified by said additional information selection command input via said additional information selection command input means, over said completely exterior digital communication line.

4. A game machine system according to claim 1, wherein communications media includes a communication line connecting means for connecting a communication line with the remote game software provider.

5. A game machine system according to claim 1, wherein one of the devices connected to said completely exterior digital communication line includes:

a usage history information storage unit for storing information about the history of usage of games; and usage history information updating means for updating said information about the history of usage of games stored in said usage history information storage unit, when said game selection request transmission means of said game executing device has transmitted said game selection command, thereby making it possible to perform accounting in accordance with the usage history information stored in said usage history information storage unit.

6. A game machine system according to claim 5, wherein the communications media includes a communication line connecting means for connecting a communication line with said remote game software provider and the game machine system further includes usage history information transmission means for transmitting said usage history information stored in said usage history information storage unit via said communication line, at a scheduled time or in response to a usage history information transmission request transmitted from said remote game software provider via said communication line.

7. A game machine system according to claim 1, wherein said completely exterior digital communication line includes a digital serial bus.

8. A game machine system according to claim 1, wherein said completely exterior digital communication line includes a wireless communication channel.

9. A set top box (STB) device including means for receiving a digital television satellite broadcast signal and for supplying television program data corresponding to the received digital television satellite broadcast signal to a display device, said STB device, the display device, and a game executing device being connected to each other via a digital communication line that is completely external to each of the STB device, the display device, and the game executing device to form a game machine system, said STB device further comprising:

an information storage unit having a drive means for storing game software information including a game control program and display data used to form a game screen in accordance with said game control program;

game software information acquisition means for acquiring said game software information which is provided by means of broadcasting or via a dedicated communication line from a remote game software provider and for storing the acquired game software information in said information storage unit; and information processing and transmitting means for reading game information from said information storage unit in response to a request received via said completely external digital communication line and transmitting said information over said completely external digital communication line to the game executing device.

10. An STB device according to claim 9, further comprising:

additional information acquisition means for acquiring additional information associated with information used in a particular game and storing said additional information in said information storage unit, said additional information being supplied by means of broadcasting or via a dedicated communication line; and additional information processing and transmission means for reading the information acquired as said additional information from said information storage unit in response to an additional information providing request received via said completely exterior digital communication line and then transmitting said information over said completely exterior digital communication line to said game executing device instead of the game information used in the particular game.

11. An STB device according to claim 9, further comprising:

communication line connecting means for connecting a communication line with said remote game software provider in response to a command issued by a user; and information request transmission means for transmitting, in response to the command issued by the user, a request for said game software information to said remote game software provider via the communication line connected by said communication line connecting means.

12. An STB device according to claim 9, further comprising:

a usage history information storage unit for storing information about the history of usage of games; and usage history information updating means for updating said information about the history of usage of games stored in said usage history information storage unit, when said request is received via said completely external digital communication line, thereby making it possible to perform accounting in accordance with the usage history information stored in said usage history information storage unit.

13. An STB device according to claim 12, further comprising:

communication line connecting means for connecting a communication line with said remote game software provider in response to a command issued by a user; and usage history information transmission means for transmitting said usage history information stored in said usage history information storage unit via said communication line, at a scheduled time or in response to a usage history information transmission request transmitted from said remote game software provider via said communication line.

14. A game executing device in a game machine system comprising a drive means for storing game software included as part of a set top box (STB) device including means for receiving a digital television satellite broadcast signal and for supplying television program data corresponding to the received digital television satellite broadcast signal to a display device, said game executing device, said display device, and said STB device being connected to each other via a digital communication line that is completely external to each of the STB device, the display device, and the game executing device, said game executing device being configured as a game controller without drive storage means for storing game software and further comprising:

game selection command input means for inputting a game selection command to select a specified game from a remote game software provider;

a game selection request transmission means for transmitting said game selection command to said remote game software provider via a communications media separate from the completely external digital communication line;

game control command input means for inputting a game control command to select the specified game;

information request transmission means for transmitting the game control command over said completely exterior digital communication line to the STB device as a request for providing the specified game from the STB device;

information acquisition means for acquiring the specified game from information received via said completely exterior digital communication line; and image information generation means for generating image information in accordance with game display data included in said specified game acquired via said information acquisition means and transmitting the generated image information over said completely external digital communication line to the display device.

15. A game executing device according to claim 14, further comprising:

additional information selection command input means for inputting an additional information selection command specifying additional information to be used instead of information used in a particular game; and additional information request transmission means for transmitting a request for additional information specified by said additional information selection command input via said additional information selection command input means, over said completely exterior digital communication line.

16. A game executing device according to claim 14, further comprising:

communication line connecting means for connecting a communication line with the remote game software provider in response to a command issued by a user; and information request transmission means for transmitting, in response to the command issued by the user, a request for the specified game to said remote game software provider via the communication line connected by said communication line connecting means.

17. A game executing device according to claim 14, further comprising:

a usage history information storage unit for storing information about the history of usage of games; and usage history information updating means for updating said information about the history of usage of games stored in said usage history information storage unit, when said request for providing the specified game is received via said completely external digital communication line, thereby making it possible to perform accounting in accordance with the usage history information stored in said usage history information storage unit.

18. A game executing device according to claim 17, further comprising:

communication line connecting means for connecting a communication line with said remote game software provider in response to a command issued by a user; and usage history information transmission means for transmitting said usage history information stored in said usage history information storage unit via said communication line, at a scheduled time or in response to a usage history information transmission request transmitted from said remote game software provider via said communication line.

19. A display device in a game machine system comprising a drive means for storing game software included as part of a set top box (STB) device including means for receiving a digital television satellite broadcast signal and for supplying television program data corresponding to the received digital television satellite broadcast signal to said display device, a game executing device being configured as a game controller without drive storage means for storing game software, said game executing device, said display device, and said STB device being connected to each other via a digital communication line that is completely external to each of the STB device, the display device, and the game executing device, said display device comprising:

image information acquisition means for acquiring data-compressed image information transmitted from said STB device over said completely external digital communication line and also image information generated, data-compressed, and transmitted over said completely external digital communication line by said game executing device;

decompression means for decompressing the data-compressed image information acquired by said image information acquisition means from said STB device and from said game executing device;

image synthesizing means for synthesizing an image from the data-compressed image information decompressed by said decompression means; and image displaying means for displaying the image synthesized by said image synthesizing means.

20. A display device according to claim 19, further comprising:

communication line connecting means for connecting a communication line with a game software provider in response to a command issued by a user; and information request transmission means for transmitting, in response to the command issued by the user, a request for a specified game to said game software provider via the communication line connected by said communication line connecting means.

21. A display device according to claim 19, further comprising:

a usage history information storage unit for storing information about the history of usage of games;

usage history information updating means for updating said information about the history of usage of games stored in said usage history information storage unit, when a game selection command transmission means of said game executing device has transmitted a game selection command, thereby making it possible to perform accounting in accordance with the usage history information stored in said usage history information storage unit.

22. A display device according to claim 21, further comprising:

communication line connecting means for connecting a communication line with a game software provider; and usage history information transmission means for transmitting said usage history information stored in said usage history information storage unit via said communication line, at a scheduled time or in response to a usage history information transmission request transmitted from said game software provider via said communication line.

23. A method of using a game using a game machine system comprising providing a drive means for storing game software as part of a set top box (STB) device, receiving a digital television satellite broadcast signal using the STB device and supplying television program data corresponding to the received digital television satellite broadcast signal from the STP device to a display device, providing a game executing device configured as a game controller without drive storage means for storing game software, connecting said display device, said game executing device, and said STB device to each other via a digital communication line that is completely external to each of the STB device, the display device, and the game executing device, said method further comprising steps of:

acquiring game software information supplied via broadcasting or a dedicated communication line using the STB device in response to a request from the game executing device;

storing the acquired game software information using the drive means of said STB device, said acquired game software information including a game control program and game displaying data used to form a game screen in accordance with said game control program;

reading the game software information acquired in the acquisition step from said STB device drive means in response to a request received from the game executing device via said completely external digital communication line;

transmitting said game software information over said completely external digital communication line to said game executing device;

receiving said game software information transmitted over said completely external digital communication line at the game executing device and generating image information in accordance with game display data included in said game software information at the game executing device;

transmitting the image information representing the generated image information over said completely external digital communication line to said image display device from said game executing device;

acquiring image information transmitted via said digital communication line at said image display device; and displaying an image in according with the image information acquired in said image information acquiring step.

24. A method of using a game according to claim 23, wherein said image information acquiring step performed by said display device acquires data-compressed image information transmitted from said STB device over said completely exterior digital communication line and also acquires image information generated, data-compressed, and transmitted over said completely exterior digital communication line by said game executing device;

and wherein the method further comprises the steps of:

decompressing the data-compressed image information acquired in said image information acquiring step; and synthesizing an image from the decompressed data-compressed image information.

25. A method of using a game according to claim 23, further comprising:

an additional information acquisition step in which said STB device acquires additional information associated with information used in a particular game and storing said additional information in said drive means, said additional information being supplied by means of broadcasting or via a dedicated communication line;

an additional information transmission step for reading the information acquired as said additional information in response to an additional information providing request received via said completely exterior digital communication line and then transmitting said information over said completely exterior digital communication line instead of original information used in the particular game;

an additional information selection command input step in which said game executing device accepts an additional information selection command specifying additional information to be used instead of information used in the particular game; and an additional information request transmission step for transmitting a request for additional information specified by said additional information selection command accepted in said additional information selection command input step, over said completely exterior digital communication line.

26. A method of using a game according to claim 23, further comprising:

a connection command acceptance step for accepting a connection command indicating that a communication line should be connected with a game software information provider;

a communication line connecting step for connecting a communication line with said game software information provider in response to said connection command accepted in said connection command acceptance step;

a command acceptance step for accepting a command indicating that a request for specified game software should be transmitted to said game software information provider; and an information request transmission step for transmitting, in response to said command accepted in said command acceptance step, a request for the specified game software to said game software information provider via the communication line connected in said communication line connecting step.

27. A method of using a game according to claim 26, further comprising:

an authentication step in which said game software information provider performs authentication when said game software information provider receives a game software providing request via said communication line connected in said communication line connecting step;

a requested information providing step for, if the sender of said game software providing request is determined as an authorized user in said authentication step, supplying the requested game software information by means of broadcasting or via a dedicated communication line; and an accounting step for performing an accounting process when a message indicating that the reception of the game software information is completed is received via said communication line connected in said communication line connecting step.

28. A method of using a game according to claim 27, further comprising:

an information usage permission transmission step for, if the sender of said game software information providing request is determined as an authorized user in said authentication step, transmitting an information usage permission message indicating that the use of the requested game software information is permitted to said sender of said game software information providing request; and an information usage permission message reception step in which said sender of said game software information providing request receives said information usage permission message transmitted from said game software information provider via said communication line connected in said communication line connected step.

29. A method of using a game according to claim 23, further comprising a usage history information updating step for updating information stored in a usage history information storage unit about the history of usage of the requested and selected game software information, when said request for the specified game software information is transmitted in said information request transmission step, thereby making it possible to perform accounting in accordance with the usage history information stored in said usage history information storage unit.

30. A method of using a game according to claim 29, further comprising:

a communication line connecting step for connecting a communication line with said game software information provider; and a usage history information transmission step for transmitting said usage history information stored in said usage history information storage unit via said communication line, at a scheduled time or in response to a usage history information transmission request transmitted from said game software information provider via said communication line.

31. A method of using a game according to claim 23, wherein said completely exterior digital communication line includes a digital serial bus.

32. A method of using a game according to claim 23, wherein said completely exterior digital communication line includes a wireless communication channel.

* * * * *